US008884720B2

United States Patent
Kanno et al.

(10) Patent No.: US 8,884,720 B2
(45) Date of Patent: Nov. 11, 2014

(54) CAPACITANCE ELEMENT AND RESONANCE CIRCUIT

(75) Inventors: Masayoshi Kanno, Kanagawa (JP); Noritaka Sato, Kanagawa (JP)

(73) Assignee: Dexerials Corporation, Tokyo (JP)

( * ) Notice: Subject to any disclaimer, the term of this patent is extended or adjusted under 35 U.S.C. 154(b) by 971 days.

(21) Appl. No.: 12/845,404

(22) Filed: Jul. 28, 2010

(65) Prior Publication Data

US 2011/0037536 A1    Feb. 17, 2011

(30) Foreign Application Priority Data

Aug. 11, 2009   (JP) ............................... P2009-186808

(51) Int. Cl.
*H03H 7/00*      (2006.01)
*H01G 4/005*     (2006.01)

(52) U.S. Cl.
CPC .................................... *H01G 4/005* (2013.01)
USPC ......................................................... 333/185

(58) Field of Classification Search
None
See application file for complete search history.

(56) References Cited

U.S. PATENT DOCUMENTS

| | | | | |
|---|---|---|---|---|
| 3,210,607 A | * | 10/1965 | Flanagan | 361/103 |
| 3,569,795 A | * | 3/1971 | Gikow | 361/434 |
| 3,613,033 A | * | 10/1971 | Denes | 333/182 |
| 3,838,320 A | * | 9/1974 | Klein | 361/303 |
| 4,024,081 A | * | 5/1977 | Ohmori et al. | 252/62.9 PZ |
| 4,179,627 A | * | 12/1979 | Reitz | 327/100 |
| 7,054,136 B2 | * | 5/2006 | Ritter et al. | 361/309 |
| 7,598,974 B2 | | 10/2009 | Ishibe | |
| 2012/0112855 A1 | * | 5/2012 | Sato et al. | 333/174 |

FOREIGN PATENT DOCUMENTS

JP   WO2005/050679       6/2005
JP        2008066682 A  * 3/2008

OTHER PUBLICATIONS

Katsuhiko Hayashi, "Discussion of Electrode Design Chip Capacitor for RF Applications", IEICE C, vol. J86-C, No. 8, pp. 927-933, 2003.

* cited by examiner

*Primary Examiner* — Robert Pascal
*Assistant Examiner* — Kimberly Glenn
(74) *Attorney, Agent, or Firm* — Oliff PLC

(57) ABSTRACT

A capacitance element includes a first electrode, a second electrode, a third electrode, a fourth electrode, a first dielectric portion, a second dielectric portion, and a third dielectric portion. To the first electrode, a signal having a first polarity is applied. To the second electrode, a signal having a second polarity is applied. The second polarity is opposite to the first polarity. To the third electrode, the signal having the second polarity is applied. The third electrode is disposed on a position opposed to the second electrode. To the fourth electrode, the signal having the first polarity is applied. The first dielectric portion is provided between the first electrode and the second electrode. The second dielectric portion is provided between the second electrode and the third electrode. The third dielectric portion is provided between the third electrode and the fourth electrode.

8 Claims, 18 Drawing Sheets

Structural example of multilayer capacitor of first embodiment

Structural example of multilayer capacitor of first embodiment

Electrode structure of multilayer capacitor of first embodiment

Equivalent circuit of multilayer capacitor of first embodiment

Structural example of multilayer capacitor of comparative example 1

Electrode structure of multilayer capacitor of comparative example 1

Equivalent circuit of multilayer capacitor of comparative example 1

Structural example of multilayer capacitor of modified example 1

Structural example of multilayer capacitor of second embodiment

Electrode structure of multilayer capacitor of second embodiment

Equivalent circuit of multilayer capacitor of second embodiment

Structural example of multilayer capacitor of comparative example 2

Electrode structure of multilayer capacitor of comparative example 2

Equivalent circuit of multilayer capacitor of comparative example 2

Structural example of multilayer capacitor of modified example 2

Equivalent circuit of multilayer capacitor of modified example 2

Structural example of multilayer capacitor of modified example 3

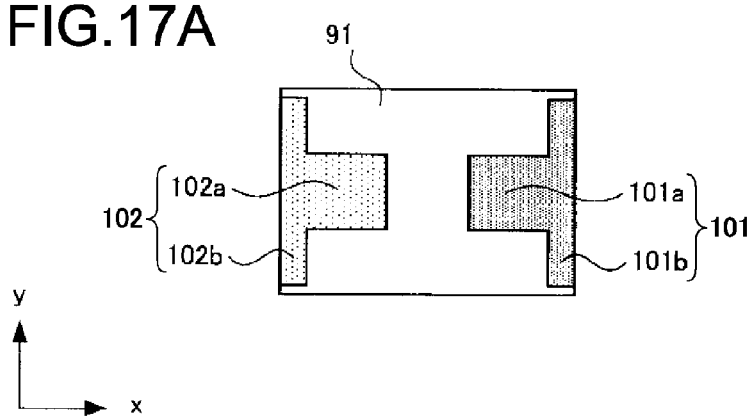
Electrode structure of multilayer capacitor of modified example 3
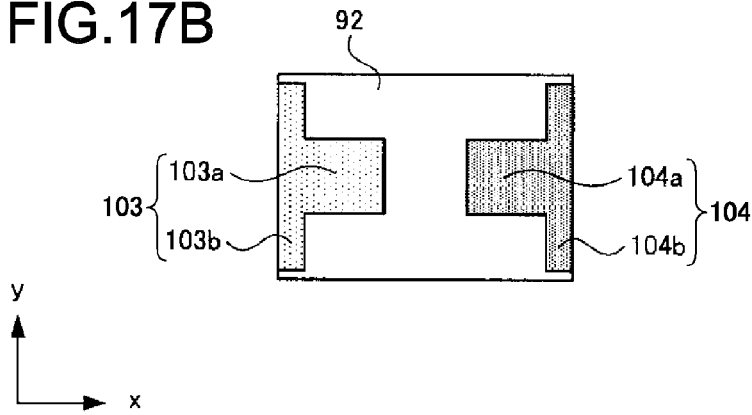
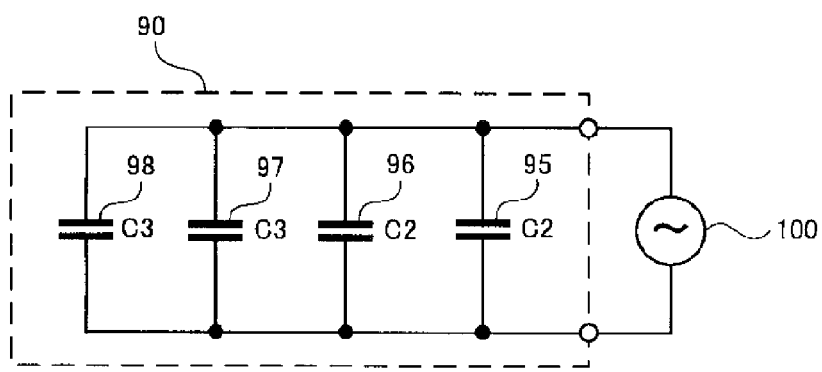
Equivalent circuit of multilayer capacitor of modified example 3
FIG. 18

Schematic structure of multilayer capacitor

Structural example of multilayer capacitor of third embodiment

Electrode structure of multilayer capacitor of third embodiment

Electrode structure of multilayer capacitor of third embodiment

Structural example of opposite electrode of modified example 4-1

Structural example of opposite electrode of modified example 4-2

Structural example of opposite electrode of modified example 4-3

Structural example of opposite electrode of modified example 4-4

Structural example of opposite electrode of modified example 4-5

Block structure of non-contact IC card of fourth embodiment

CAPACITANCE ELEMENT AND RESONANCE CIRCUIT

CROSS REFERENCES TO RELATED APPLICATIONS

The present application claims priority to Japanese Patent Application No. 2009-186808 filed on Aug. 11, 2009, the entire contents of which are being incorporated herein by reference.

BACKGROUND

The present disclosure relates to a capacitance element and a resonance circuit, and more specifically, to a capacitance element of a multilayer type in which a dielectric layer and an electrode are alternately stacked and a resonance circuit including the same.

In the past, there have been developed various capacitance elements of a multilayer type (hereinafter, referred to as multilayer capacitance element) in each of which a dielectric layer and an internal electrode are alternately stacked. Such capacitance elements are used in various electronic apparatuses. Further, with reduction in size and increase in performance of recent electronic apparatuses, development of smaller, higher-performance multilayer capacitance elements having the above-mentioned structure are being needed.

To serve the need, there have been proposed various kinds of techniques in related art to obtain a smaller, higher-performance multilayer capacitance element (see, domestic republication of PCT international publication WO 05/050679 (hereinafter, referred to as Patent Document 1) and Discussion of Electrode Design in Chip Capacitor for RF Applications, written by Katsuhiko Hayashi, Journal C of The Institute of Electronics, Information and Communication Engineers, Vol. J86-C, No. 8, pp. 927-933, 2003 (hereinafter, referred to as Non-patent Document 1), for example). Patent Document 1 discloses a technique of suppressing a residual stress of the inside or the outer surface of a multilayer capacitance element.

Further, Non-patent Document 1 discloses a technique of providing the multilayer structure of internal electrodes in which the electrodes are prevented from being directly opposed to each other in a stacked direction of dielectric layers of the multilayer capacitance element. In Non-patent Document 1, by using such a multilayer structure of the inner electrodes, variation in capacitance of the multilayer capacitance element is reduced.

SUMMARY

As described above, with the reduction in size and the increase in performance of recent electronic apparatuses, the development of smaller, higher-performance multilayer capacitance elements are being needed. However, if the multilayer capacitance element is miniaturized, the area of the internal electrode in the device is reduced, resulting in increase in electrode resistance. In this case, there arises a problem in that a Q value (quality of factor) of the multilayer capacitance element, which is inversely proportional to the electrode resistance (direct-current resistance) of the internal electrode, is reduced.

In view of the above-mentioned circumstances, it is desirable to provide a higher-performance multilayer capacitance element whose electrode resistance is further reduced and a resonance circuit including such a multilayer capacitance element.

According to an embodiment, there is provided a capacitance element including a first electrode, a second electrode, a third electrode, a fourth electrode, a first dielectric portion, a second dielectric portion, and a third dielectric portion. To the first electrode, a signal having a first polarity is applied. To the second electrode, a signal having a second polarity is applied. The second polarity is opposite to the first polarity. To the third electrode, the signal having the second polarity is applied. The third electrode is disposed on a position opposed to the second electrode. To the fourth electrode, the signal having the first polarity is applied. The first dielectric portion is provided between the first electrode and the second electrode. The second dielectric portion is provided between the second electrode and the third electrode. The third dielectric portion is provided between the third electrode and the fourth electrode.

Further, according to another embodiment, there is provided a resonance circuit. The resonance circuit includes a resonance capacitor including the capacitance element according to the embodiment of the present invention and a resonance coil connected to the resonance capacitor.

In the capacitance element according to the embodiment, signals having different polarities are applied to the first and second electrodes formed while the first dielectric portion is sandwiched therebetween, respectively, and to the third and fourth electrodes formed while the third dielectric portion is sandwiched therebetween, respectively. Therefore, capacitors are formed between the first and second electrodes and between the third and fourth electrodes, respectively. On the other hand, signals having the same polarity are applied to the second and third electrodes disposed so as to be opposed while the second dielectric portion is sandwiched therebetween. Therefore, a capacitor is not formed between the second and third electrodes.

With this structure, the number of internal electrodes provided in the capacitance element can be further increased in order to a desired capacitance. This will be described in detail in the following embodiments according to the embodiment.

As described above, in the embodiments, the number of internal electrodes can be further increased in the capacitance element, so an electrode resistance of the capacitance element can be further reduced. Thus, according to the embodiments, the reduction in Q value of the capacitance element can be suppressed, and the higher-performance capacitance element can be provided.

Additional features and advantages are described herein, and will be apparent from the following Detailed Description and the figures.

BRIEF DESCRIPTION OF THE FIGURES

FIGS. 17A and 17B are exploded views each showing the multilayer capacitor of the modified example 3;

FIG. 18 is a diagram showing an equivalent circuit of the multilayer capacitor of the modified example 3;

DETAILED DESCRIPTION

Hereinafter, an example of a multilayer capacitance element and an electronic apparatus (resonance circuit) including the same according to embodiments will be described in order of the following items with reference to the drawings.

Figure 1:
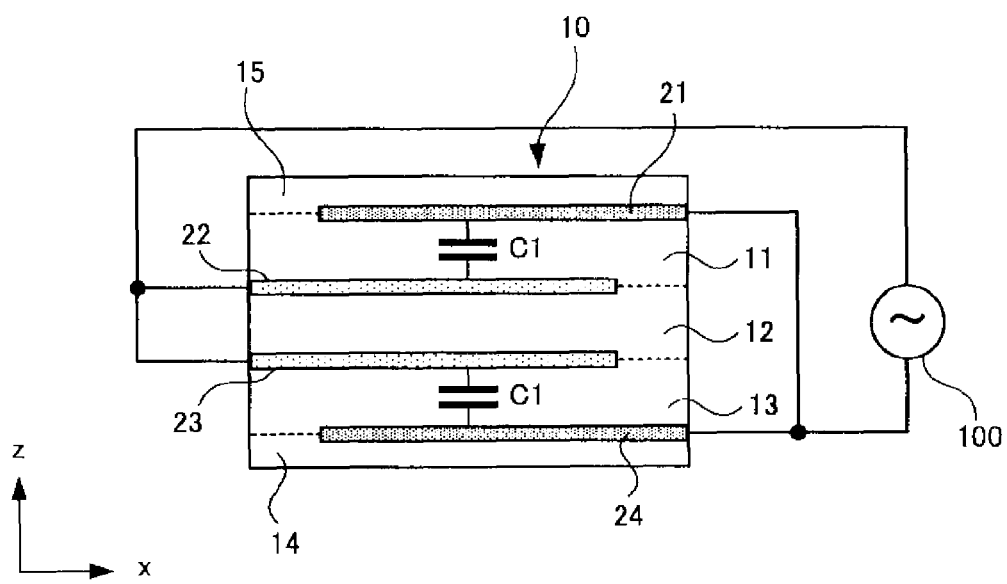
FIG. 1 is a schematic cross-sectional view showing a multilayer capacitance element (hereinafter, referred to as multilayer capacitor) according to a first embodiment.

1. First embodiment: Example of basic structure of multilayer capacitance element
2. Second embodiment: Structural example of multilayer capacitance element in which pair of internal electrodes that constitute capacitor is not opposed in thickness direction of dielectric layer
3. Third embodiment: Structural example of multilayer capacitance element in which extended directions of electrode portions of pair of internal electrodes that constitute capacitor are intercrossed
4. Fourth embodiment: Structural example of non-contact reception apparatus including multilayer capacitance element according to the embodiments of the present invention 1. First Embodiment Structure of Multilayer Capacitance Element FIG. 1 is a schematic cross-sectional view showing a multilayer capacitance element (hereinafter, referred to as multilayer capacitor) according to a first embodiment. It should be noted that the structure of the multilayer capacitor of this embodiment can be applied not only to a capacitor whose capacitance is hardly changed regardless of a kind of an input signal (alternate current or direct current) and a level of the signal (hereinafter, referred to as constant-capacitance capacitor) but also to a variable-capacitance capacitor.

A multilayer capacitor 10 (capacitance element) of this embodiment includes five dielectric layers 11 to 15 and four internal electrodes 21 to 24. It should be noted that in the following description, the dielectric layers 11 to 13, 14, and 15 are referred to as first to third dielectric layers (first to third dielectric portions), a lower dielectric layer, and an upper dielectric layer, respectively, and the internal electrodes 21 to 24 are referred to as first to fourth electrodes as needed, as a matter of convenience for explanation.

In this embodiment, on the lower dielectric layer 14, the fourth electrode 24, the third dielectric layer 13, the third electrode 23, the second dielectric layer 12, the second electrode 22, the first dielectric layer 11, the first electrode 21, and the upper dielectric layer 15 are stacked in the stated order, thereby structuring the multilayer capacitor 10.

In addition, in this embodiment, as shown in FIG. 1, the first electrode 21 and the fourth electrode 24 are connected to one of terminals of a signal power source 100 that is externally provided, and the second electrode 22 and the third electrode 23 are connected to the other terminal of the signal power source 100. By connecting the first to fourth electrodes 21 to 24 to the signal power source 100 as described above, capacitors (hereinafter, referred to as internal capacitor) are formed between the first electrode 21 and the second electrode 22 and between the third electrode 23 and the fourth electrode 24, respectively, in the multilayer capacitor 10. It should be noted that signals having the same polarity are applied to the second electrode 22 and the third electrode 23 between which the second dielectric layer 12 is sandwiched, so the internal capacitor is not formed in the second dielectric layer 12.

That is, in the multilayer capacitor 10 of this embodiment, a layer in which the internal capacitor is formed and a layer in which the internal capacitor is not formed are alternately stacked.

First, the structure of each of the dielectric layers will be described. The upper (lower) surface of each of the lower dielectric layer 14 and the upper dielectric layer 15 has a rectangular shape whose long side and short side have a ratio of 2:1 in length.

In addition, in this embodiment, as shown in FIG. 1, the thicknesses of the first to third dielectric layers 11 to 13 are set to be the same (approximately 2 µm, for example). In the present invention, the thicknesses of the first to third dielectric layers are not limited to this, and may be set as appropriate in accordance with a purpose, a necessary capacitance, or the like. For example, the thicknesses of the first to third dielectric layers 11 to 13 may be set to be different from one another, or only the thickness of the second dielectric layer 12 may be set to be less than the thicknesses of the first and third dielectric layers 11 and 13. It is desirable to set the thickness of the second dielectric layer 12 in which the internal capacitor is not formed to be less than the thicknesses of the first and third dielectric layers 11 and 13 in terms of the reduction in thickness (reduction in size) of the multilayer capacitor 10. In addition, the thicknesses of the lower dielectric layer 14 and the upper dielectric layer 15 may be set as appropriate in accordance with a purpose or the like.

In this embodiment, the first to third dielectric layers 11 to 13, the lower dielectric layer 14, and the upper dielectric layer 15 are made of the same dielectric material. It should be noted that the present invention is not limited to this. The dielectric layers may be made of different dielectric materials. However, in terms of facilitation of manufacture, the first to third dielectric layers 11 to 13, the lower dielectric layer 14, and the upper dielectric layer 15 are desirable to be made of the same dielectric material as in this embodiment.

In the case where the multilayer capacitor 10 according to this embodiment is used as the constant-capacitance capacitor, the dielectric layers are made of a paraelectric material having a low relative permittivity. Examples of the paraelectric material include paper, polyethylene terephthalate, polypropylene, polyphenylene sulfide, polystyrene, $TiO_2$, $MgTiO_2$, $MgTiO_3$, $SrMgTiO_2$, $Al_2O_3$, $Ta_2O_5$, and the like.

In addition, in the case where the multilayer capacitor 10 according to this embodiment is used as the variable-capacitance capacitor, the dielectric layers are made of a ferroelectric material whose relative permittivity exceeds 1000. By forming the dielectric layers by such a ferroelectric material, the capacitances of the dielectric layers can be changed in accordance with a control signal that is externally applied.

As the ferroelectric material, a ferroelectric material that causes ionic polarization can be used. The ferroelectric material that causes the ionic polarization is a ferroelectric material that is formed of an ionic crystal material and is electrically polarized due to atom displacement of a positive ion and a negative ion. Generally, the ferroelectric material that causes the ionic polarization is expressed by a chemical formula of $ABO_3$ (O: oxygen element) in which A and B represent predetermined two elements, and has a perovskite structure. Examples of such a ferroelectric material include barium titanate ($BaTiO_3$), potassium niobate ($KNbO_3$), lead titanate ($PbTiO_3$), and the like. In addition, as the ferroelectric material, for example, PZT (lead zirconate titanate) obtained by mixing lead zirconate ($PbZrO_3$) with lead titanate ($PbTiO_3$) may be used.

Further, as the ferroelectric material, a ferroelectric material that causes electron polarization may be used. The ferroelectric material is divided into a part that leans to a positive charge and a part that leans to a negative charge, to cause an electric dipole moment and thus cause the polarization. As such a material, in related art, a rare earth iron oxide has been reported which causes the polarization and shows characteristics of ferroelectrics by forming a $Fe^{2+}$ charge surface and a $Fe^{3+}$ charge surface. In this system, it has been reported that a material expressed by a molecular formula of $(RE).(TM)_2.O_4$ (O: oxygen element), in which RE represents a rare earth element and TM represents an iron group element, has a high permittivity. It should be noted that examples of the rare earth element include Y, Er, Yb, and Lu (in particular, Y and heavy rare-earth element), and examples of the iron group element include Fe, Co, and Ni (in particular, Fe). In addition, examples of $(RE).(TM)_2.O_4$ include $ErFe_2O_4$, $LuFe_2O_4$, and $YFe_2O_4$. Further, as the ferroelectric material, a ferroelectric material having anisotropy may be used.

Figure 2A:
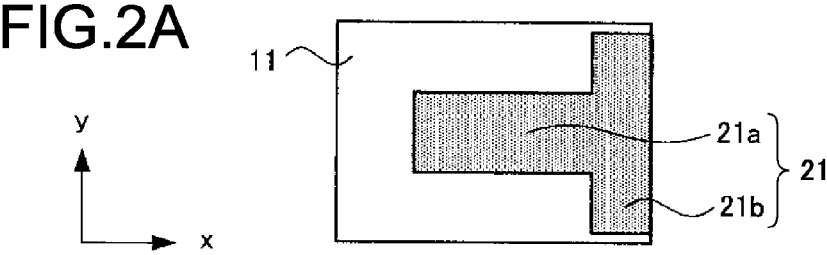
FIGS. 2A to 2D are exploded views each showing the multilayer capacitor according to the first embodiment.
Figure 2B:
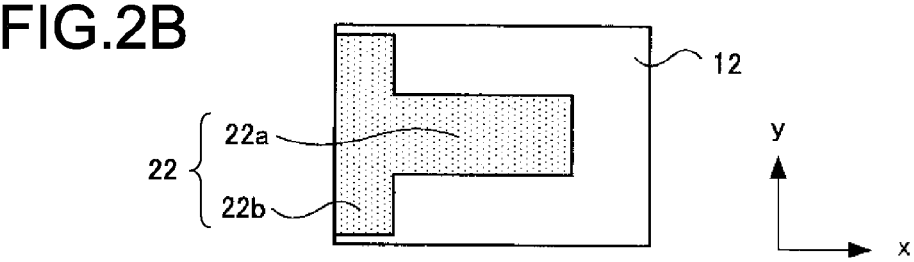
Figure 2C:
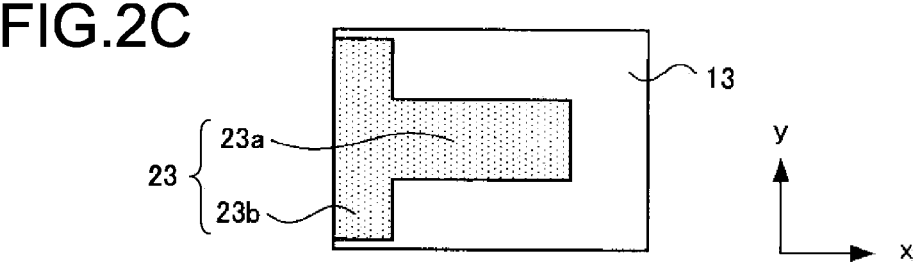
Figure 2D:
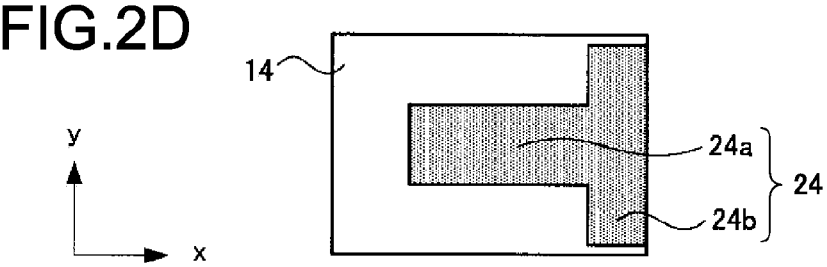

Next, the structures of the internal electrodes will be described. FIGS. 2A to 2D are exploded views each showing the multilayer capacitor 10. It should be noted that in FIGS. 2A to 2D, the upper dielectric layer 15 is not shown for ease of explanation. FIG. 2A shows an electrode structure of the first electrode 21 formed on the first dielectric layer 11. FIG. 2B shows an electrode structure of the second electrode 22 formed on the second dielectric layer 12. FIG. 2C shows an electrode structure of the third electrode 23 formed on the third dielectric layer 13. FIG. 2D shows an electrode structure of the fourth electrode 24 formed on the lower dielectric layer 14.

It should be noted that in this embodiment, as shown in FIGS. 2A to 2D, the first to fourth electrodes 21 to 24 have T-letter shaped surfaces having the same size. However, the present invention is not limited to this. The structures (e.g., shape or size) of the first to fourth electrodes 21 to 24 may be set as appropriate in consideration of a purpose, a necessary capacitance, or the like. For example, the structures of the first to fourth electrodes 21 to 24 may be different from one another. Alternatively, the same structure may be used in the internal electrodes to which signals having the same polarity are applied, and different structures may be used in the internal electrodes to which signals having different polarities are applied.

The first electrode 21 is constituted of a terminal portion 21b and an electrode portion 21a. The terminal portion 21b is formed along a short side (right short side in FIG. 2A) of the first dielectric layer 11 on one side. The electrode portion 21a is extended from the center of the terminal portion 21b in a perpendicular direction (x direction in FIG. 2A) to the extended direction (y direction in FIG. 2A) of the terminal portion 21b.

The second electrode 22 is constituted of a terminal portion 22b and an electrode portion 22a. The terminal portion 22b is formed along a short side (left short side in FIG. 2B) of the second dielectric layer 12 on the other side. The electrode portion 22a is extended from the center of the terminal portion 22b in a perpendicular direction (x direction in FIG. 2B) to the extended direction (y direction in FIG. 2B) of the terminal portion 22b.

The third electrode 23 has the same structure as the second electrode 22, and is constituted of a terminal portion 23b and an electrode portion 23a. The terminal portion 23b is formed along a short side of the third dielectric layer 13 on the other side. The electrode portion 23a is extended from the center of the terminal portion 23b in a perpendicular direction (x direction in FIG. 2C) to the extended direction (y direction in FIG. 2C) of the terminal portion 23b. In addition, the third electrode 23 is disposed at a position opposed to the second electrode 22 with the second dielectric layer 12 being sandwiched therebetween.

The fourth electrode 24 has the same structure as the first electrode 21, and is constituted of a terminal portion 24b and an electrode portion 24a. The terminal portion 24b is formed along a short side of the lower dielectric layer 14 on the one side. The electrode portion 24a is extended from the center of the terminal portion 24b in a perpendicular direction (x direction in FIG. 2D) to the extended direction (y direction in FIG. 2D) of the terminal portion 24b. In addition, the fourth electrode 24 is disposed at a position opposed to the first electrode 21 with the first to third dielectric layers 11 to 13 being sandwiched therebetween.

It should be noted that the pair of internal electrodes formed with the dielectric layer in which the internal capacitor is formed being sandwiched therebetween is disposed at such a position that electrode portions of the pair of internal electrodes are opposed to each other in the thickness direction of the dielectric layer. In addition, the length of the electrode portions of the pair of internal electrodes that form the internal capacitor in the extended direction is set so that the electrode portions of the pair of internal electrodes are opposed in the thickness direction of the dielectric layer. That is, when one of the pair of internal electrodes that forms the internal capacitor is projected on the formation surface of the other internal electrode, the disposed position of the pair of internal electrodes and the lengths by which the electrode portions thereof are extended are set so that a projection pattern of the electrode portion of the one internal electrode is overlapped with the electrode portion of the other internal electrode. It should be noted that, hereinafter, the area where the projection pattern of the electrode portion of the one internal electrode is overlapped with the electrode portion of the other internal electrode is referred to as an opposite electrode area.

In addition, in this embodiment, in a plurality of internal capacitors formed in the multilayer capacitor 10, the disposed positions of the internal electrodes and the lengths by which the electrode portions are extended are set so that the areas of the opposite electrode areas are uniform. However, the present invention is not limited to this. For example, the disposed positions of the internal electrodes and the lengths by which the electrode portions are extended may be set so that the areas of the opposite electrode areas of the internal capacitors differ from one another in accordance with a purpose, a necessary capacitance, or the like.

It should be noted that the multilayer capacitor 10 is provided with a pair of external terminals (not shown). The pair of external terminals is connected to a pair of terminals of the signal power source 100 through a lead or the like. The terminal portion 21b of the first electrode 21 and the terminal portion 24b of the fourth electrode 24 are connected to one external terminal, and the terminal portion 22b of the second electrode 22 and the terminal portion 23b of the third electrode 23 are connected to the other external terminal. However, the present invention is not limited to this. For example, the external terminal may be provided for each of the internal electrodes, and electrical connection between the first electrode 21 and the fourth electrode 24 and between the second electrode 22 and the third electrode 23 may be established through a circuit wiring, when the capacitors are mounted on the circuit.

In addition, in the case where the multilayer capacitor 10 of this embodiment is used as the variable-capacitance capacitor, the pair of external terminals is also connected to the terminal of a control power source, in addition to the signal power source 100. In this case, the multilayer capacitor 10 is connected to the signal power source 100 through a bias elimination capacitor, and connected to the control power source through a current-limiting resistor.

The first to fourth electrodes 21 to 24 are made of conductive paste containing metal fine powders (for example, Pd, Pd/Ag, Ni), for example. Therefore, the manufacturing cost of the multilayer capacitor 10 can be reduced. It should be noted that in this embodiment, the first to fourth electrodes 21 to 24 are made of the same material. However, the present invention is not limited to this. The first to fourth electrodes 21 to 24 may be made of different materials, or the material may be changed for each pair of internal electrodes constituting the internal capacitors in accordance with a purpose or the like.

In addition, in this embodiment, the first to fourth electrodes 21 to 24 are set to have the same thickness. However, the present invention is not limited to this. The first to fourth electrodes 21 to 24 may have different thicknesses, or the thickness may be changed for each pair of the internal electrodes constituting the internal capacitors in accordance with a purpose or the like.

As described above, in the multilayer capacitor 10 of this embodiment, the internal electrodes have the same structure, and the dielectric layers have the same structure. Therefore, two internal capacitors formed in the multilayer capacitor 10 have the same capacitance (C1). However, the present invention is not limited to this. In accordance with a purpose or the like, the internal electrodes and the dielectric layers may respectively have different structures as appropriate, and the two internal capacitors may have different capacitances.

Figure 3:
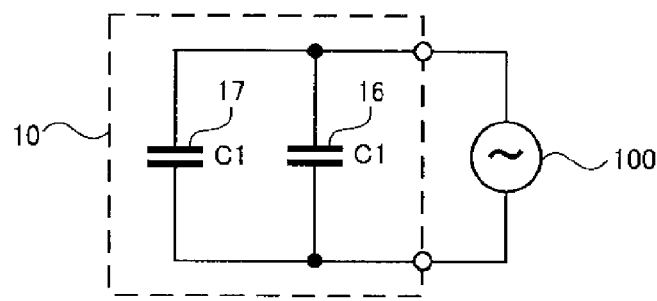
FIG. 3 is a diagram showing an equivalent circuit of the multilayer capacitor according to the first embodiment.

FIG. 3 is a diagram showing an equivalent circuit of the multilayer capacitor 10 of this embodiment. As described above, since the two internal capacitors formed in the multilayer capacitor 10 have the same capacitance C1 in this embodiment, the equivalent circuit of the multilayer capacitor 10 is a circuit in which two internal capacitors 16 and 17 having the capacitance C1 are connected in parallel to the signal power source 100. In this case, the entire capacitance of the multilayer capacitor 10 of this embodiment is 2*C1.

(Method of Manufacturing Multilayer Capacitor)

Next, a description will be given on an example of a method of manufacturing the multilayer capacitor 10 of this embodiment. First, a sheet member (having a thickness of approximately 2 μm) made of the dielectric material described above is prepared. The sheet member serves as one of the first to third dielectric layers 11 to 13 and the lower dielectric layer 14 described above.

Next, the conductive paste obtained by processing the metal fine powders such as Pd, Pd/Ag, and Ni into a paste is prepared. Then, the conductive paste is applied (by serigraph or the like) to one surface of the sheet member through a mask in which an opening portion corresponding to the shape (T-letter shape) of the internal electrode is formed, to form the internal electrode. Then, in this embodiment, four sheet members (hereinafter, referred to as electrode-equipped sheet member) on one surface of which the internal electrode is formed are manufactured.

Then, the four electrode-equipped sheet members prepared as described above are stacked so that the internal electrodes and the sheet members are alternately disposed. In this case, the internal electrodes are stacked in the manner shown in FIGS. 2A to 2D. That is, the four electrode-equipped sheet members are stacked so as to set, from the uppermost electrode-equipped sheet member, the terminal portions of the internal electrodes to be disposed in the vicinity of one short side of the sheet member (right short side in FIG. 2), in the vicinity of the other short side thereof (left short side in FIG. 2), in the vicinity of the other short side, and in the vicinity of the one short side in the stated order. Subsequently, an additionally prepared sheet member in which the internal electrode is not formed is stacked on the surface on the side from which the internal electrode is exposed. The sheet member additionally prepared serves as the upper dielectric layer 15.

Next, the stacked members are subjected to heat-pressure bonding. Subsequently, the members that have been subjected to the heat-pressure bonding are subjected to high-temperature firing in a reducing atmosphere, thereby integrating the sheet members and the conductive paste layer (internal electrode). In this way, the multilayer capacitor 10 is manufactured in this embodiment.

It should be noted that, to reduce the electrode resistance of the multilayer capacitor 10, a method of directly forming the second electrode 22 on the third electrode 23 without forming the second dielectric layer 12 (the conductive paste are applied twice) and thickening the internal electrode may be considered. However, in this case, it is necessary to change the formation process of the second electrode 22 as compared to the formation process of the other internal electrodes. In contrast, in the method of manufacturing the multilayer capacitor 10 according to this embodiment, since the formation processes of the internal electrodes are the same as described above, the multilayer capacitor 10 can be more easily manufactured as compared to the above-mentioned case.

Comparative Example 1

Here, the structure of a multilayer capacitor in related art (comparative example 1) will be described prior to a description on an effect of the multilayer capacitor 10 of the first embodiment.

Figure 4:
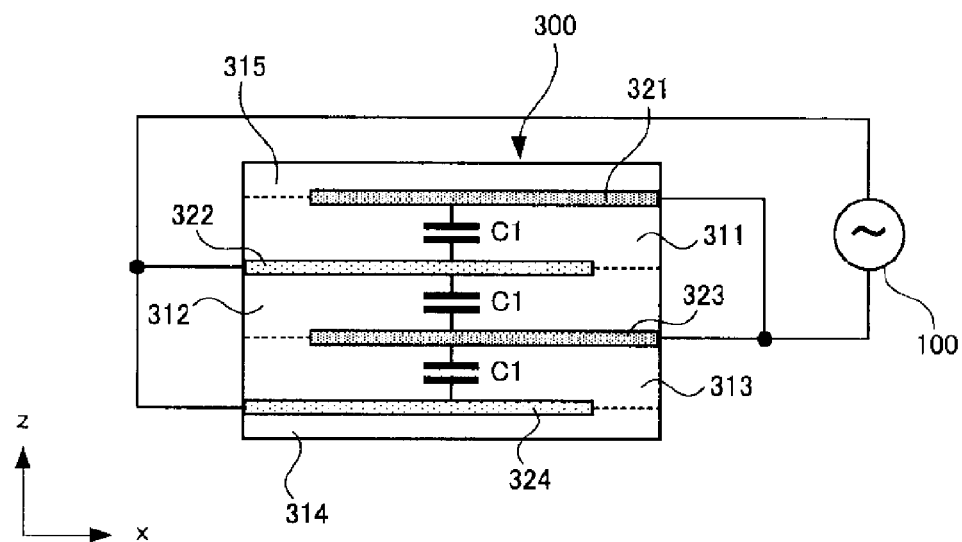
FIG. 4 is a schematic cross-sectional view showing a multilayer capacitor of a comparative example 1.

FIG. 4 is a schematic cross-sectional view showing a multilayer capacitor 300 of the comparative example 1. As in the first embodiment, the multilayer capacitor 300 of the comparative example 1 mainly includes five dielectric layers 311 to 315 (first to third dielectric layers, a lower dielectric layer, and an upper dielectric layer) and four internal electrodes 321 and 324 (first to fourth electrodes). In addition, in the comparative example 1, on the lower dielectric layer 314, the fourth electrode 324, the third dielectric layer 313, the third electrode 323, the second dielectric layer 312, the second electrode 322, the first dielectric layer 311, the first electrode 321, and the upper dielectric layer 315 are stacked in the stated order.

In addition, in the multilayer capacitor 300 of the comparative example 1, the first electrode 321 and the third electrode 323 are connected to one terminal of the signal power source 100 externally provided, and the second electrode 322 and the fourth electrode 324 are connected to the other terminal of the signal power source 100. That is, in the multilayer capacitor 300 of the comparative example 1, internal electrodes to which signals having different polarities are applied are alternately stacked with the dielectric layer being sandwiched therebetween. By connecting the internal electrodes to the signal power source 100 as described above, an internal capacitor is formed for each dielectric layer in the multilayer capacitor 300.

In the comparative example 1, the structure (shape, size, formation material, and the like) of each of the dielectric layers is set to be the same as that in the first embodiment. Further, the structure (shape, size, formation material, and the like) of each of the internal electrodes is also set to be the same as that in the first embodiment.

Figure 5A:
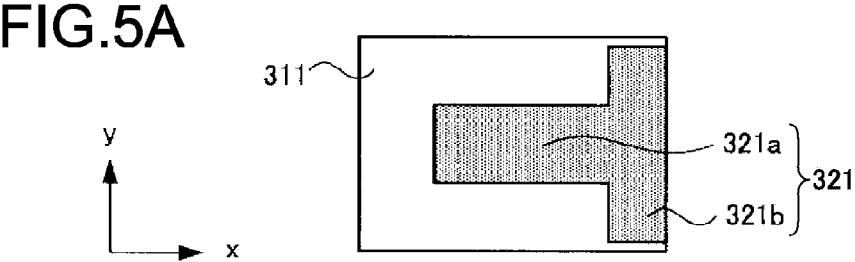
FIGS. 5A to 5D are exploded views each showing the multilayer capacitor of the comparative example 1.
Figure 5B:
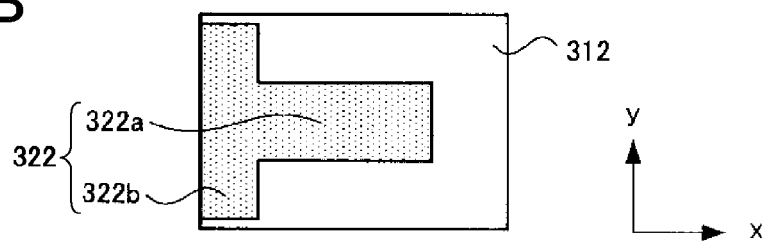
Figure 5C:
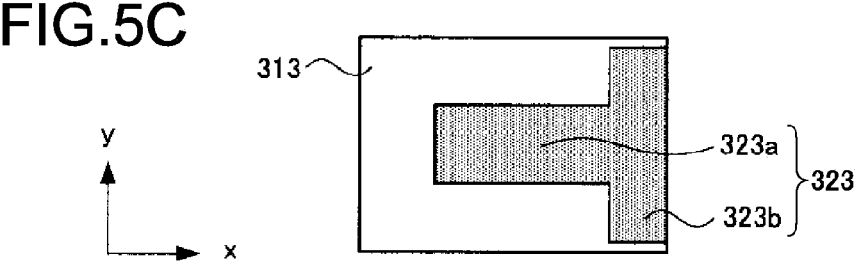
Figure 5D:
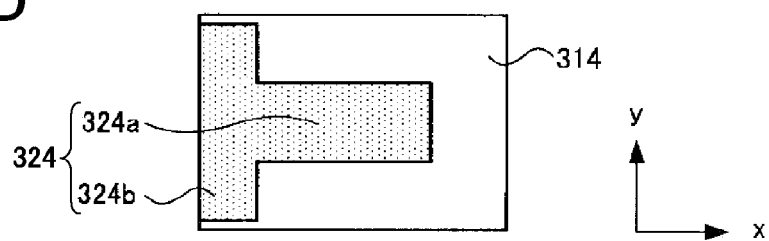

In addition, FIGS. 5A to 5D are exploded views each showing the multilayer capacitor 300 of the comparative example 1. In FIGS. 5A to 5D, for ease of explanation, the upper dielectric layer 315 is not shown. FIG. 5A shows an electrode structure of the first electrode 321 formed on the first dielectric layer 311. FIG. 5B shows an electrode structure of the second electrode 322 formed on the second dielectric layer 312. FIG. 5C shows an electrode structure of the third electrode 323 formed on the third dielectric layer 313. FIG. 5D shows an electrode structure of the fourth electrode 324 formed on the lower dielectric layer 314.

The first electrode 321 has a T-letter surface shape and is constituted of an electrode portion 321a and a terminal portion 321b. The terminal portion 321b is formed along a short side (right short side in FIG. 5A) of the rectangular-shaped first dielectric layer 311 on one side. The electrode portion 321a is extended from the center of the terminal portion 321b in a perpendicular direction (x direction in FIG. 5A) to the extended direction (y direction in FIG. 5A) of the terminal portion 321b.

The second electrode 322 has a T-letter surface shape and is constituted of an electrode portion 322a and a terminal portion 322b. The terminal portion 322b is formed along a short side (left short side in FIG. 5B) of the rectangular-shaped second dielectric layer 312 on the other side. The electrode portion 322a is extended from the center of the terminal portion 322b in a perpendicular direction (x direction in FIG. 5B) to the extended direction (y direction in FIG. 5B) of the terminal portion 322b.

The third electrode 323 has a T-letter surface shape and is constituted of an electrode portion 323a and a terminal portion 323b. The terminal portion 323b is formed along a short side (right short side in FIG. 5C) of the rectangular-shaped third dielectric layer 313 on the one side. The electrode portion 323a is extended from the center of the terminal portion 323b in a perpendicular direction (x direction in FIG. 5C) to the extended direction (y direction in FIG. 5C) of the terminal portion 323b. In addition, the third electrode 323 is disposed at a position opposed to the first electrode 321 with the first dielectric layer 311 and the second dielectric layer 312 being sandwiched therebetween.

The fourth electrode 324 has a T-letter surface shape and is constituted of an electrode portion 324a and a terminal portion 324b. The terminal portion 324b is formed along a short side (left short side in FIG. 5D) of the rectangular-shaped lower dielectric layer 314 on the other side. The electrode portion 324a is extended from the center of the terminal portion 324b in a perpendicular direction (x direction in FIG. 5D) to the extended direction (y direction in FIG. 5D) of the terminal portion 324b. In addition, the fourth electrode 324 is disposed at a position opposed to the second electrode 322 with the second and third dielectric layers 312 and 313 being sandwiched therebetween.

In the comparative example 1, the disposed positions of the internal electrodes and the lengths by which the electrode portions are extended are set so that a projection pattern of the electrode portion of a predetermined internal electrode is overlapped with the electrode portion of the internal electrode adjacent thereto at a time when the predetermined internal electrode is projected on the formation surface of the internal electrode adjacent thereto with the dielectric layer being sandwiched therebetween.

In addition, in the comparative example 1, in a plurality of internal capacitors formed in the multilayer capacitor 300, the disposed positions of the internal electrodes and the lengths by which the electrode portions are extended are set so that the areas of the opposite electrode areas are uniform. That is, three internal capacitors formed in the multilayer capacitor 300 have the same capacitance. Further, in the comparative example 1, the structure (shape, size, formation material, and the like) of each of the dielectric layers and the internal electrodes is also set to be the same as that in the first embodiment. Thus, the capacitance of the internal capacitor formed in each of the dielectric layer of the multilayer capacitor 300 of the comparative example 1 is the same as the capacitance C1 of the internal capacitor formed in the multilayer capacitor (FIG. 1) of the first embodiment.

Figure 6:
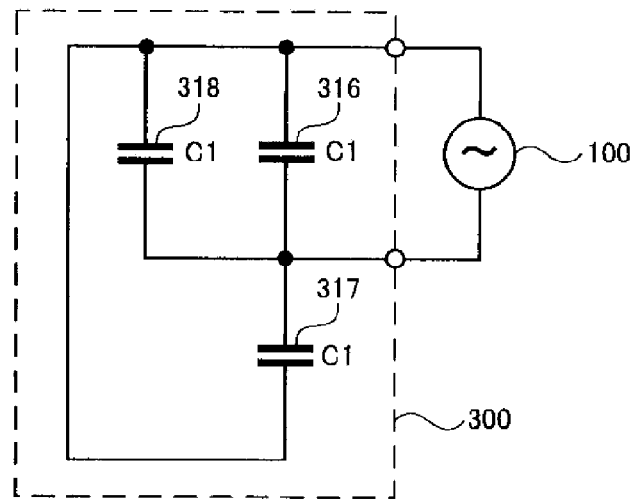
FIG. 6 is a diagram showing an equivalent circuit of the multilayer capacitor of the comparative example 1.

FIG. 6 is a diagram showing an equivalent circuit of the multilayer capacitor 300 of the comparative example 1. In the comparative example 1, the equivalent circuit of the multilayer capacitor 300 is a circuit in which three internal capacitors 316 to 318 each having the capacitance C1 are connected in parallel to the signal power source 100. Therefore, the entire capacitance of the multilayer capacitor 300 of the comparative example 1 is 3*C1.

Here, the multilayer capacitor 10 of the first embodiment and the multilayer capacitor 300 of the comparative example 1 are compared with each other in terms of a relationship between the number of internal electrodes and the number of internal capacitors. In the multilayer capacitor 10 of the first embodiment, the two internal capacitors each having the capacitance C1 are formed with respect to the four internal electrodes. On the other hand, in the multilayer capacitor 300 of the comparative example 1, three internal capacitors each having the capacitance C1 are formed with respect to the four internal electrodes.

Accordingly, in the case where the multilayer capacitor 10 of the first embodiment is set to be a multilayer capacitor having the same capacitance as the multilayer capacitor 300 of the comparative example 1, the internal electrodes of the first embodiment are necessary to be 1.5 times as many as those of the comparative example 1. That is, in the case where the multilayer capacitor 300 of the comparative example 1 and the multilayer capacitor 10 of the first embodiment are manufactured to have the same capacitance, the number of internal electrodes of the multilayer capacitor 10 of the first embodiment is greater than that of the comparative example 1. Thus, in the multilayer capacitor 10 of the first embodiment, the electrode resistance (direct-current resistance) of the entire multilayer capacitor 10 can be further reduced as compared to the comparative example 1.

As described above, in this embodiment, the electrode resistance of the entire multilayer capacitor 10 can be further reduced, which can suppress the Q value from being reduced, with the result that a higher-performance multilayer capacitor 10 can be provided.

In addition, in this embodiment, since it is possible to further reduce the electrode resistance of the entire multilayer capacitor 10, the capacitance of the multilayer capacitor can be changed by a smaller drive voltage in the case where the multilayer capacitor is used as a variable-capacitance capacitor.

Further, as described above, the multilayer capacitor 10 of this embodiment can be manufactured more easily at a lower cost. Thus, according to this embodiment, the higher-performance multilayer capacitor 10 can be provided more easily at a low cost.

Modified Example 1

In the first embodiment, the example is given in which the four internal electrodes 21 to 24 are stacked with the three dielectric layers 11 to 13 being alternately sandwiched therebetween, and the two internal capacitors are formed in the multilayer capacitor 10. However, the present invention is not limited to this. The number of stacked dielectric layers and internal electrodes can be increased as appropriate in consideration of a purpose, a necessary capacitance, or the like. In a modified example 1, such an example will be described.

Figure 7:
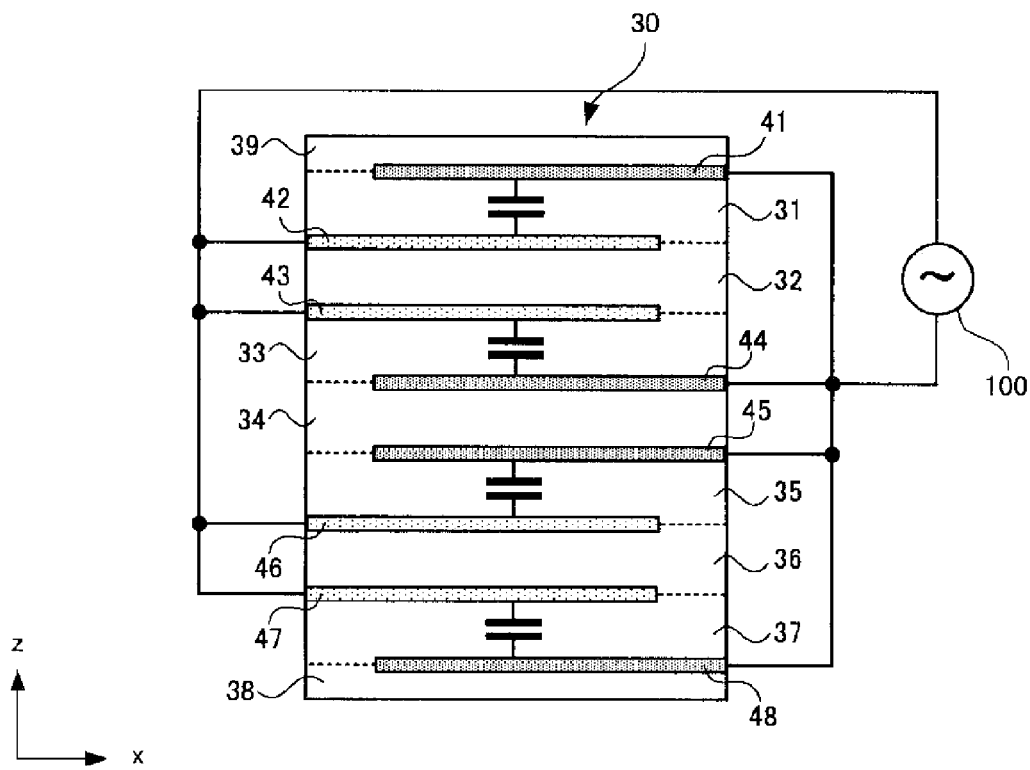
FIG. 7 is a schematic cross-sectional view showing a multilayer capacitor of a modified example 1.

FIG. 7 is a schematic cross-sectional view showing a multilayer capacitor 30 of the modified example 1. The multilayer capacitor 30 of the modified example 1 includes nine dielectric layers 31 to 39 (first to seventh dielectric layers, a lower dielectric layer, and an upper dielectric layer) and eight internal electrodes 41 to 48 (first to eight electrodes). Further, in the modified example 1, on the lower dielectric layer 38, the eighth electrode 48, the seventh dielectric layer 37, the seventh electrode 47, the sixth dielectric layer 36, the sixth electrode 46, the fifth dielectric layer 35, the fifth electrode 45, and the fourth dielectric layer 34 are stacked in the stated order. In addition, in the modified example 1, on the fourth dielectric layer 34, the fourth electrode 44, the third dielectric layer 33, the third electrode 43, the second dielectric layer 32, the second electrode 42, the first dielectric layer 31, the first electrode 41, and the upper dielectric layer 39 are stacked in the stated order.

In the multilayer capacitor 30 of the modified example 1, the first electrode 41, the fourth electrode 44, the fifth electrode 45, and the eighth electrode 48 are connected to one terminal of the signal power source 100 externally provided. In addition, the second electrode 42, the third electrode 43, the sixth electrode 46, and the seventh electrode 47 are connected to the other terminal of the signal power source 100.

By connecting the internal electrodes as described above, internal capacitors are formed between the first and second electrodes 41 and 42, between the third and fourth electrodes 43 and 44, between the fifth and sixth electrodes 45 and 46, and between the seventh and eighth electrodes 47 and 48, respectively. On the other hand, the internal capacitor is not formed between the second and third electrodes 42 and 43, between the fourth electrodes 44 and 45, and between the sixth and seventh electrodes 46 and 47. That is, as in the first embodiment, in the multilayer capacitor 30 of the modified example 1, the layer in which the internal capacitor is formed and the layer in which the internal capacitor is not formed are alternately stacked.

As shown in FIG. 7, the multilayer capacitor 30 of the modified example 1 has the structure in which two multilayer capacitors 10 (FIG. 1) of the first embodiment are stacked. Therefore, in the modified example 1, the entire electrode resistance of the multilayer capacitor 30 can be made to be smaller as compared to the structure in which two multilayer capacitors 300 (FIG. 4) of the comparative example 1 are stacked.

In the modified example 1, the description is given on the structural example in which the two multilayer capacitors 10 (FIG. 1) of the first embodiment are stacked. However, the present invention is not limited to this. For example, the structure in which three or more multilayer capacitors 10 (FIG. 1) of the first embodiment are provided may be used. Alternatively, in the multilayer capacitor 30 (FIG. 7) of the modified example 1, the structure in which the seventh and eighth electrodes 47 and 48 are not provided may be used.

Further, the multilayer capacitor 10 (FIG. 1) of the first embodiment and the multilayer capacitor 300 (FIG. 4) of the comparative example 1 may be stacked. In this case, in a part of the multilayer capacitor, the same structural part as the multilayer capacitor 10 of the first embodiment is provided. Therefore, as compared to the structure in which the two multilayer capacitor 300 (FIG. 4) of the comparative example 1 are stacked, the entire electrode resistance of the multilayer capacitor 30 can be further reduced.

As described above, since the electrode resistance of the entire multilayer capacitor 30 can be further reduced also in the modified example 1, the same effect as the first embodiment can be obtained.

2. Second Embodiment

In the first embodiment, the structural example of the multilayer capacitor is given in which the pair of internal electrodes constituting the internal capacitor is opposed to each other in the thickness direction of the dielectric layer. However, the present embodiment is not limited to this. The pair of internal electrodes constituting the internal capacitor may not necessarily be opposed in the thickness direction of the dielectric layer. In a second embodiment, an example of such a structure will be described.

(Structure of Multilayer Capacitance Element)

Figure 8:
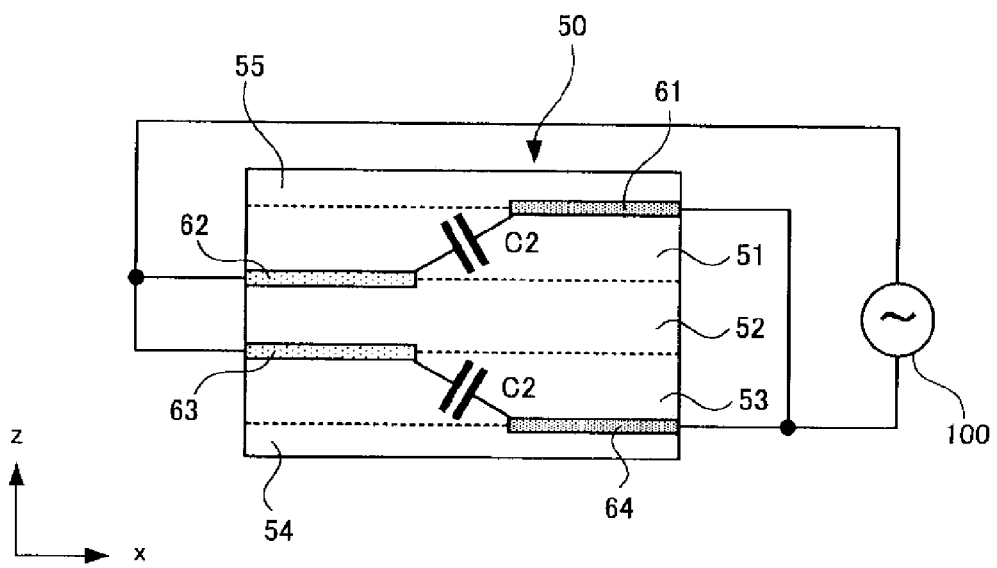
FIG. 8 is a schematic cross-sectional view showing a multilayer capacitor according to a second embodiment.

FIG. 8 is a schematic cross-sectional view showing a multilayer capacitor according to the second embodiment. It should be noted that the structure of the multilayer capacitor of this embodiment can be applied not only to the constant-capacitance capacitor but also to the variable-capacitance capacitor.

A multilayer capacitor 50 (capacitance element) of this embodiment includes five dielectric layers 51 to 55 and four internal electrodes 61 to 64. Hereinafter, as a matter of convenience of explanation, the dielectric layers 51 to 53, 54, and 55 are referred to as first to third dielectric layers (first to third dielectric portions), a lower dielectric layer, and an upper dielectric layer. The internal electrodes 61 to 64 are referred to as first to fourth electrodes.

In this embodiment, on the lower dielectric layer 54, the fourth electrode 64, the third dielectric layer 53, the third electrode 63, the second dielectric layer 52, the second electrode 62, the first dielectric layer 51, the first electrode 61, and the upper dielectric layer 55 are stacked in the stated order, thereby constituting the multilayer capacitor 50.

In addition, in the multilayer capacitor 50 of this embodiment, the first and fourth electrodes 61 and 64 are connected to one terminal of the signal power source 100 externally provided, and the second and third electrodes 62 and 63 are connected to the other terminal of the signal power source 100 as shown in FIG. 8. By connecting the first to fourth electrodes 61 to 64 to the signal power source 100 in the above-mentioned manner, an internal capacitor is formed between the first electrode 61 and the second electrode 62 and between the third electrode 63 and the fourth electrode 64, respectively, in the multilayer capacitor 50. It should be noted that signals having the same polarity are applied to the second and third electrodes 62 and 63 formed with the second dielectric layer 52 being sandwiched therebetween, so the internal capacitor is not formed in the second dielectric layer 52.

That is, in the multilayer capacitor 50 of this embodiment, the layer in which the internal capacitor is formed and the layer in which the internal capacitor is not formed are also alternately stacked as in the first embodiment (FIG. 1).

First, the structure of the dielectric layers will be described. The first to third dielectric layers 51 to 53, the lower dielectric layer 54, and the upper dielectric layer 55 each have a rectangular upper surface (lower surface). The ratio of the long side to the short side of the rectangular surface can be set to 2:1, for example.

In addition, in this embodiment, as shown in FIG. 8, the first to third dielectric layers 51 to 53 are set to have the same thickness (for example, approximately 2 μm). However, the thicknesses of the first to third dielectric layers 51 to 53 may be set as appropriate in accordance with a purpose, a necessary capacitance, or the like. For example, the thicknesses of the first to third dielectric layers 51 to 53 may be set to be different from one another, or only the thickness of the second dielectric layer 52 may be set to be less than the thicknesses of the first and third dielectric layers 51 and 53. It is desirable to set the thickness of the second dielectric layer 52 in which the internal capacitor is not formed to be less than the thicknesses of the first and third dielectric layers 51 and 53 in terms of the reduction in thickness (reduction in size) of the multilayer capacitor 50.

In this embodiment, the first to third dielectric layers 51 to 53, the lower dielectric layer 54, and the upper dielectric layer 55 are made of the same dielectric material. The dielectric layers may be made of different dielectric materials. However, in terms of facilitation of manufacture, the first to third dielectric layers 51 to 53, the lower dielectric layer 54, and the upper dielectric layer 55 are desirable to be made of the same dielectric material as in this embodiment. As the material of the dielectric layers of this embodiment, the same material as that of the dielectric layers in the first embodiment can be used.

Figure 9A:
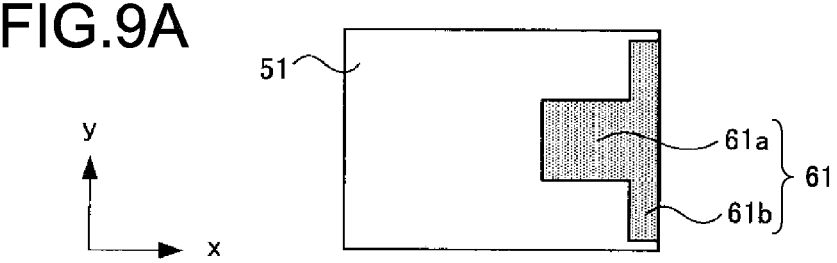
FIGS. 9A to 9D are exploded views each showing the multilayer capacitor according to the second embodiment.
Figure 9B:
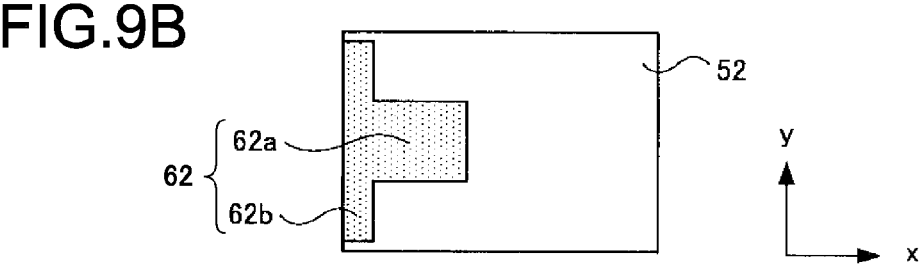
Figure 9C:
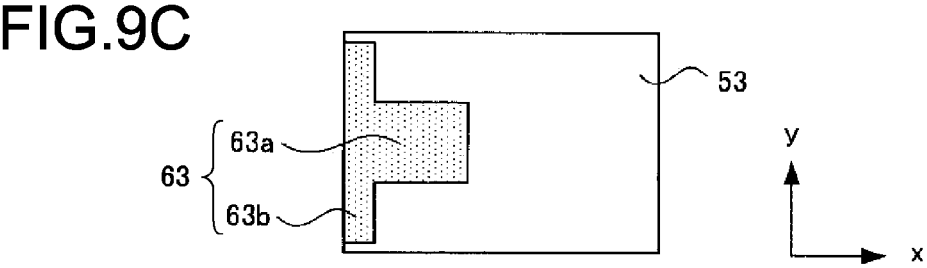
Figure 9D:
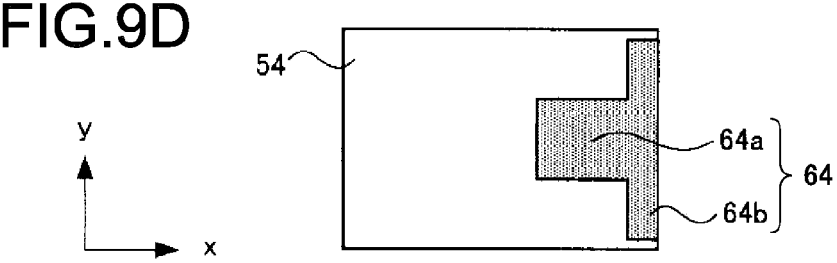

Next, the structures of the internal electrodes will be described. FIGS. 9A to 9D are exploded views each showing the multilayer capacitor 50. In FIGS. 9A to 9D, the upper dielectric layer 55 is not shown for ease of explanation. FIG. 9A shows an electrode structure of the first electrode 61 formed on the first dielectric layer 51. FIG. 9B shows an electrode structure of the second electrode 62 formed on the second dielectric layer 52. FIG. 9C shows an electrode structure of the third electrode 63 formed on the third dielectric layer 53. FIG. 9D shows an electrode structure of the fourth electrode 64 formed on the lower dielectric layer 54.

In this embodiment, as shown in FIGS. 9A to 9D, the first to fourth electrodes 61 to 64 have T-letter shaped surfaces having the same size. However, the structures (e.g., shape or size) of the first to fourth electrodes 61 to 64 can be set as appropriate in consideration of a purpose, a necessary capacitance, or the like. For example, the structures of the first to fourth electrodes 61 to 64 may be different from one another. Alternatively, the material may be changed for each pair of the internal electrodes constituting the internal capacitor.

The first electrode 61 is constituted of a terminal portion 61b and an electrode portion 61a. The terminal portion 61b is formed along a short side (right short side in FIG. 9A) of the first dielectric layer 51 on one side. The electrode portion 61a is extended from the center of the terminal portion 61b in a perpendicular direction (x direction in FIG. 9A) to the extended direction (y direction in FIG. 9A) of the terminal portion 61b.

The second electrode 62 is constituted of a terminal portion 62b and an electrode portion 62a. The terminal portion 62b is formed along a short side (left short side in FIG. 9B) of the second dielectric layer 52 on the other side. The electrode portion 62a is extended from the center of the terminal portion 62b in a perpendicular direction (x direction in FIG. 9B) to the extended direction (y direction in FIG. 9B) of the terminal portion 62b.

The third electrode 63 has the same structure as the second electrode 62, and is constituted of a terminal portion 63b and an electrode portion 63a. The terminal portion 63b is formed along a short side of the third dielectric layer 53 on the other side. The electrode portion 63a is extended from the center of the terminal portion 63b in a perpendicular direction (x direction in FIG. 9C) to the extended direction (y direction in FIG. 9C) of the terminal portion 63b. In addition, the third electrode 63 is disposed at a position opposed to the second electrode 62 with the second dielectric layer 52 being sandwiched therebetween.

The fourth electrode 64 has the same structure as the first electrode 61, and is constituted of a terminal portion 64b and an electrode portion 64a. The terminal portion 64b is formed along a short side of the lower dielectric layer 54 on the one side. The electrode portion 64a is extended from the center of the terminal portion 64b in a perpendicular direction (x direction in FIG. 9D) to the extended direction (y direction in FIG. 9D) of the terminal portion 64b. In addition, the fourth electrode 64 is disposed at a position opposed to the first electrode 61 with the first to third dielectric layers 51 to 53 being sandwiched therebetween.

The pair of internal electrodes formed with the dielectric layer in which the internal capacitor is formed being sandwiched therebetween is disposed on such a position that electrode portions of the pair of internal electrodes are not opposed to each other in the thickness direction of the dielectric layer. In addition, the length of the electrode portions of the pair of internal electrodes that forms the internal capacitor in the extended direction is set so that the electrode portions of the pair of internal electrodes are not opposed in the thickness direction of the dielectric layer. That is, when one of the pair of internal electrodes that forms the internal capacitor is projected on the formation surface of the other internal electrode, the disposed position of the pair of internal electrodes and the lengths by which the electrode portions thereof are extended are set so that a projection pattern of the electrode portion of the one internal electrode is not overlapped with the electrode portion of the other internal electrode.

In addition, in this embodiment, the disposed positions of the internal electrodes and the lengths by which the electrode portions are extended are set so that a plurality of internal capacitors formed in the multilayer capacitor 50 have the same capacitance. However, the disposed positions of the internal electrodes and the lengths by which the electrode portions are extended may be set so that the capacitances of the plurality of internal capacitors differ from one another in accordance with a purpose, a necessary capacitance, or the like.

The multilayer capacitor 50 is provided with a pair of external terminals. The pair of external terminals is connected to the pair of terminals of the signal power source 100 through a lead or the like. The terminal portion 61b of the first electrode 61 and the terminal portion 64b of the fourth electrode 64 are connected to one external terminal, and the terminal portion 62b of the second electrode 62 and the terminal portion 63b of the third electrode 63 are connected to the other external terminal. However, the present invention is not limited to this. For example, the external terminal may be provided for each of the internal electrodes, and electrical connection between the first electrode 61 and the fourth electrode 64 and between the second electrode 62 and the third electrode 63 may be established through a circuit wiring when the capacitors are mounted on the circuit.

In addition, in the case where the multilayer capacitor 50 of this embodiment is used as the variable-capacitance capacitor, the pair of external terminals is also connected to the terminal of the control power source, in addition to the signal power source 100. In this case, the multilayer capacitor 50 is connected to the signal power source 100 through a bias elimination capacitor and connected to the control power source through a current-limiting resistor.

Further, in this embodiment, the first to fourth electrodes 61 to 64 can be formed of the same material as that of the internal electrodes described in the first embodiment. In addition, the multilayer capacitor 50 of this embodiment can be manufactured as in the first embodiment. The first to fourth electrodes 61 to 64 are set to have the same thickness in this embodiment. However, in accordance with a purpose or the like, the thicknesses of the first to fourth electrodes 61 to 64 may be set to be different from one another, or set to be different for each pair of internal electrodes constituting the internal capacitor.

As described above, since the structures of the internal electrodes and the structures of the dielectric layers are set to be the same, respectively, in the multilayer capacitor 50 of this embodiment, capacitances (C2) of the two internal capacitors formed in the multilayer capacitor 50 are the same. However, the present invention is not limited to this. The structures of the internal electrodes and the structures of the dielectric layers are set to be appropriately different, respectively, in accordance with a purpose or the like, and thus the capacitances of the two internal capacitors may be different.

Figure 10:
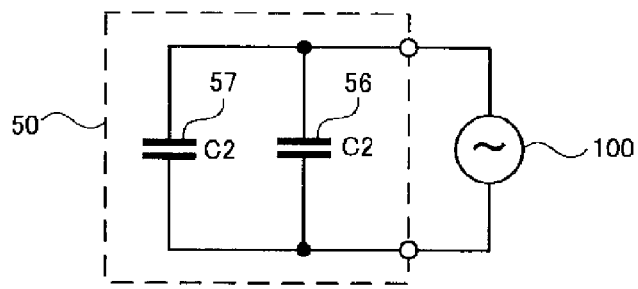
FIG. 10 is a diagram showing an equivalent circuit of the multilayer capacitor according to the second embodiment.

FIG. 10 is a diagram showing an equivalent circuit of the multilayer capacitor 50 of this embodiment. As described above, in this embodiment, the capacitances (C2) of the two internal capacitors formed in the multilayer capacitor 50 are the same. Therefore, the equivalent circuit of the multilayer capacitor 50 is a circuit in which two internal capacitors 56 and 57 each having the capacitance C2 are connected in parallel to the signal power source 100. In this case, the entire capacitance of the multilayer capacitor 50 in this embodiment is 2*C2.

Comparative Example 2

Here, a description will be given on a structure of a multilayer capacitor (see, for example, Non-patent Document 1: comparative example 2) in related art, in which the pair of internal electrodes disposed with the dielectric layer being sandwiched therebetween is not opposed to each other in the thickness direction of the dielectric layer.

Figure 11:
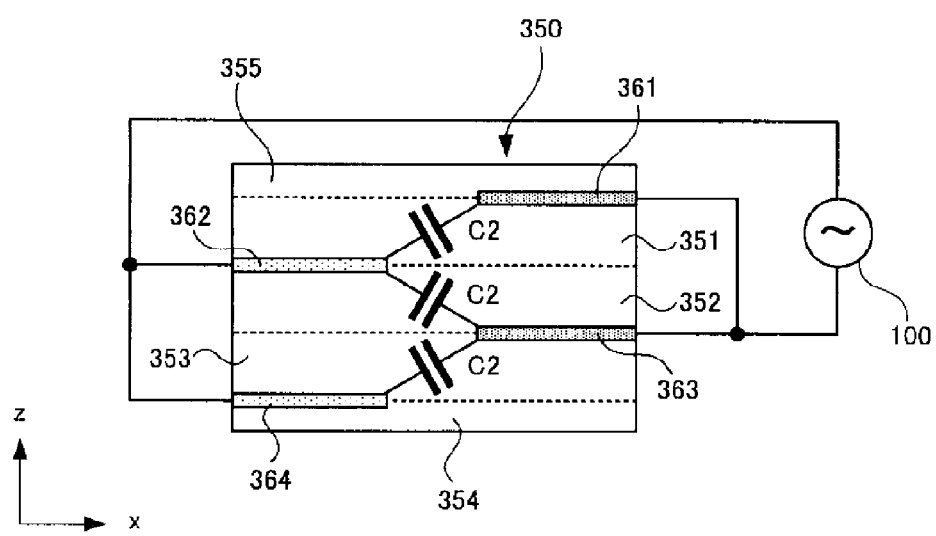
FIG. 11 is a schematic cross-sectional view showing a multilayer capacitor of a comparative example 2.

FIG. 11 is a schematic cross-sectional view showing a multilayer capacitor 350 of a comparative example 2. As in the second embodiment, the multilayer capacitor 350 of the comparative example 2 mainly includes five dielectric layers 351 to 355 (first to third dielectric layers, a lower dielectric layer, and an upper dielectric layer) and four internal electrodes 361 and 364 (first to fourth electrodes). In addition, in the comparative example 2, on the lower dielectric layer 354, the fourth electrode 364, the third dielectric layer 353, the third electrode 363, the second dielectric layer 352, the second electrode 362, the first dielectric layer 351, the first electrode 361, and the upper dielectric layer 355 are stacked in the stated order.

In addition, in the multilayer capacitor 350 of the comparative example 2, the first electrode 361 and the third electrode 363 are connected to one terminal of the signal power source 100 externally provided, and the second electrode 362 and the fourth electrode 364 are connected to the other terminal of the signal power source 100. That is, in the multilayer capacitor 350 of the comparative example 2, internal electrodes to which signals having different polarities are applied are alternately stacked with the dielectric layer being sandwiched therebetween. By connecting the internal electrodes to the signal power source 100 as described above, an internal capacitor is formed for each dielectric layer in the multilayer capacitor 350.

It should be noted that in the comparative example 2, the structure (shape, size, formation material, and the like) of each of the dielectric layers is set to be the same as that in the second embodiment. Further, the structure (shape, size, formation material, and the like) of each of the internal electrodes is also set to be the same as that in the second embodiment.

Figure 12A:
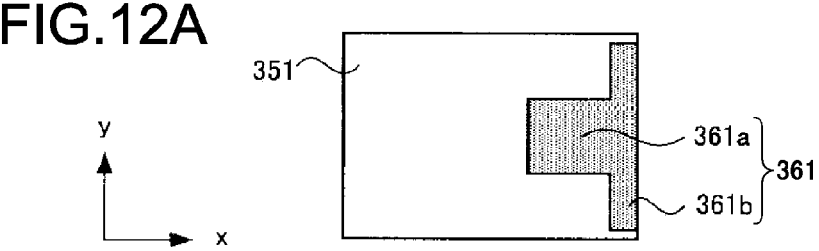
FIGS. 12A to 12D are exploded views each showing the multilayer capacitor of the comparative example 2.
Figure 12B:
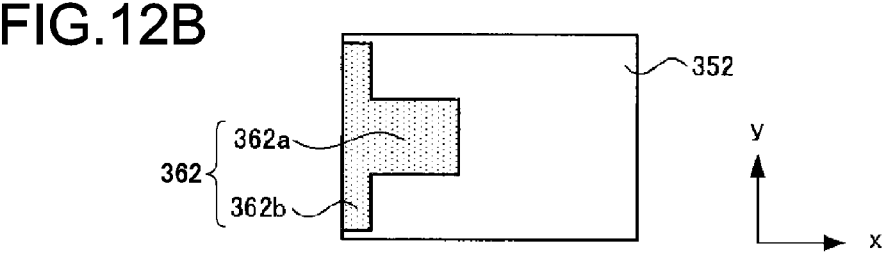
Figure 12C:
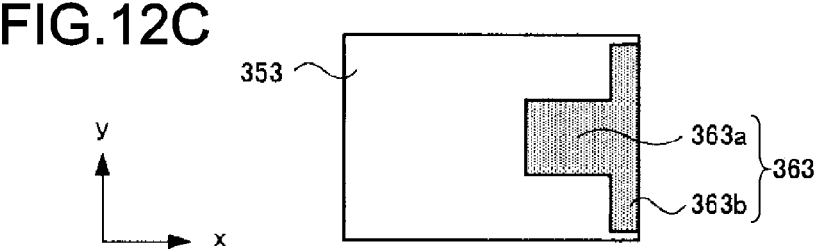
Figure 12D:
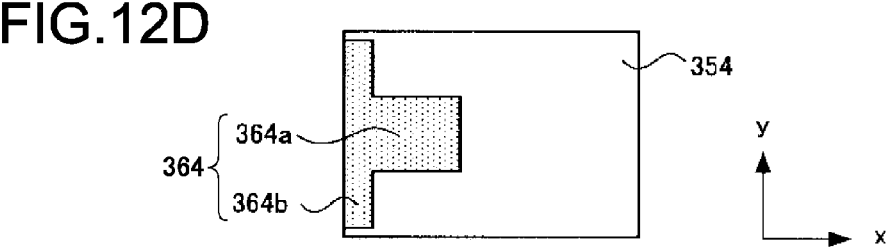

In addition, FIGS. 12A to 12D are exploded views each showing the multilayer capacitor 350 of the comparative example 2. In FIGS. 12A to 12D, for ease of explanation, the upper dielectric layer 355 is not shown. FIG. 12A shows an electrode structure of the first electrode 361 formed on the first dielectric layer 351. FIG. 12B shows an electrode structure of the second electrode 362 formed on the second dielectric layer 352. FIG. 12C shows an electrode structure of the third electrode 363 formed on the third dielectric layer 353. FIG. 12D shows an electrode structure of the fourth electrode 364 formed on the lower dielectric layer 354.

The first electrode 361 has a T-letter surface shape and is constituted of an electrode portion 361a and a terminal portion 361b. The terminal portion 361b is formed along a short side (right short side in FIG. 12A) of the rectangular-shaped first dielectric layer 351 on one side. The electrode portion 361a is extended from the center of the terminal portion 361b in a perpendicular direction (x direction in FIG. 12A) to the extended direction (y direction in FIG. 12A) of the terminal portion 361b.

The second electrode 362 has a T-letter surface shape and is constituted of an electrode portion 362a and a terminal portion 362b. The terminal portion 362b is formed along a short side (left short side in FIG. 12B) of the rectangular-shaped second dielectric layer 352 on the other side. The electrode portion 362a is extended from the center of the terminal portion 362b in a perpendicular direction (x direction in FIG. 12B) to the extended direction (y direction in FIG. 12B) of the terminal portion 362b.

The third electrode 363 has a T-letter surface shape and is constituted of an electrode portion 363a and a terminal portion 363b. The terminal portion 363b is formed along a short side (right short side in FIG. 12C) of the rectangular-shaped third dielectric layer 353 on the one side. The electrode portion 363a is extended from the center of the terminal portion 363b in a perpendicular direction (x direction in FIG. 12C) to the extended direction (y direction in FIG. 12C) of the terminal portion 363b. In addition, the third electrode 363 is disposed at a position opposed to the first electrode 361 with the first dielectric layer 351 and the second dielectric layer 352 being sandwiched therebetween.

The fourth electrode 364 has a T-letter surface shape and is constituted of an electrode portion 364a and a terminal portion 364b. The terminal portion 364b is formed along a short side (left short side in FIG. 12D) of the rectangular-shaped lower dielectric layer 354 on the other side. The electrode portion 364a is extended from the center of the terminal portion 364b in a perpendicular direction (x direction in FIG. 12D) to the extended direction (y direction in FIG. 12D) of the terminal portion 364b. In addition, the fourth electrode 364 is disposed at a position opposed to the second electrode 362 with the second and third dielectric layers 352 and 353 being sandwiched therebetween.

It should be noted that in the comparative example 2, the internal electrodes are structured so that a projection pattern of the electrode portion of one internal electrode, out of the pair of internal electrodes constituting the internal capacitor, is not overlapped with the electrode portion of the other internal electrode when the one internal electrode is projected on the formation surface of the other internal electrode. In addition, in the comparative example 2, for example, the disposed positions and the lengths by which the electrode portions are extended are set so that the capacitances (C2) of the internal capacitors formed in the multilayer capacitor 350 are uniform.

Figure 13:
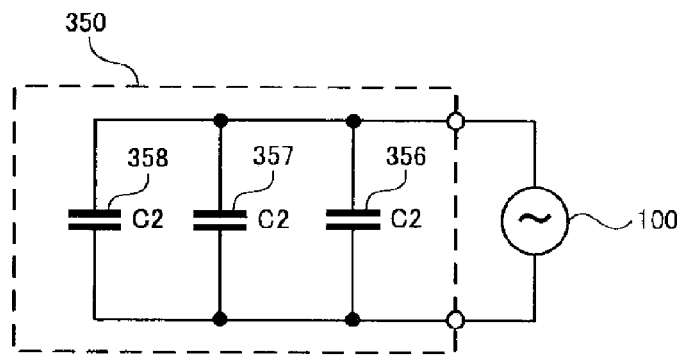
FIG. 13 is a diagram showing an equivalent circuit of the multilayer capacitor of the comparative example 2.

FIG. 13 is a diagram showing an equivalent circuit of the multilayer capacitor 350 of the comparative example 2. In the comparative example 2, the equivalent circuit of the multilayer capacitor 350 is a circuit in which three internal capacitors 356 to 358 each having the capacitance C2 are connected in parallel to the signal power source 100. Therefore, the entire capacitance of the multilayer capacitor 350 of the comparative example 2 is 3*C2.

Here, the multilayer capacitor 50 of the second embodiment and the multilayer capacitor 350 of the comparative example 2 are compared with each other in terms of a relationship between the number of internal electrodes and the number of internal capacitors. In the multilayer capacitor 50 of the second embodiment, the two internal capacitors each having the capacitance C2 are formed with respect to the four internal electrodes. On the other hand, in the multilayer capacitor 350 of the comparative example 2, three internal capacitors each having the capacitance C2 are formed with respect to the four internal electrodes.

Accordingly, in order to cause the multilayer capacitor 50 of the second embodiment to have the same capacitance as the multilayer capacitor 350 of the comparative example 2, the number of internal electrodes in the second embodiment is necessary to be 1.5 times that in the comparative example 2. That is, in the case where the multilayer capacitor 350 of the comparative example 2 and the multilayer capacitor 50 of the second embodiment are manufactured to have the same capacitance, the number of the internal electrodes of the multilayer capacitor 50 of the second embodiment is greater than that of the comparative example 2. Thus, in the multilayer capacitor 50 of the second embodiment, the electrode resistance (direct-current resistance) of the entire multilayer capacitor 50 can be further reduced as compared to the comparative example 2.

As described above, in this embodiment, the electrode resistance of the entire multilayer capacitor 50 can be further reduced as in the first embodiment, with the result that the same effect as in the first embodiment can be obtained.

In addition, in the multilayer capacitor 50 of this embodiment, a distance between the pair of internal electrodes constituting the internal capacitor can be set to be greater than that in the first embodiment. Therefore, the structure of the multilayer capacitor 50 of this embodiment is more desirable for manufacturing a multilayer capacitor having a smaller capacitance.

Modified Example 2

The example is given in which only the dielectric layer 52 forms the area between the second electrode 62 and the third electrode 63 in which the internal capacitor is not formed in the multilayer capacitor 50 (FIG. 8) of the second embodiment. However, the present invention is not limited to this. The area between the second electrode 62 and the third electrode 63 may be formed of a plurality of dielectric layers and internal electrodes provided between the dielectric layers. In a modified example 2, such an example will be described.

Figure 14:
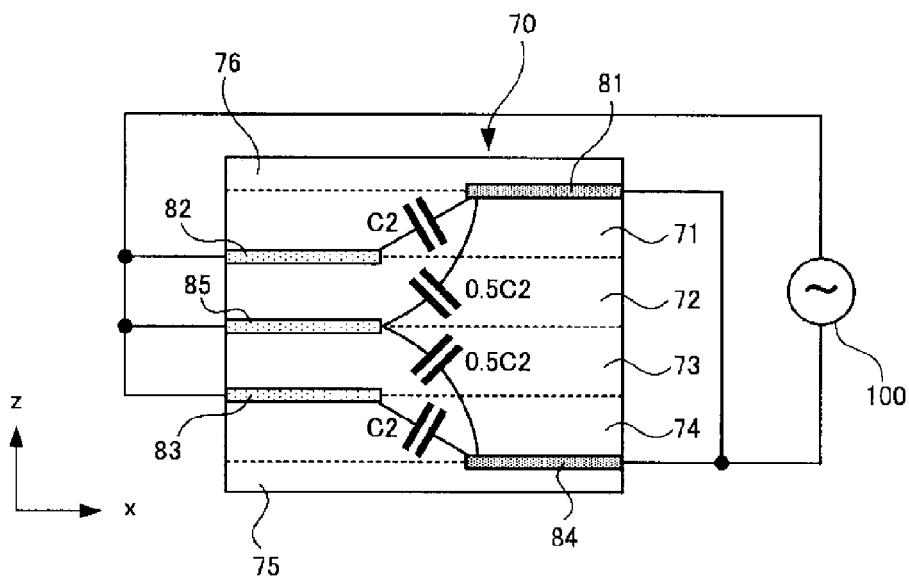
FIG. 14 is a schematic cross-sectional view of a multilayer capacitor of a modified example 2.

FIG. 14 is a schematic cross-sectional view of a multilayer capacitor of a modified example 2. A multilayer capacitor 70 of the modified example 2 includes six dielectric layers 71 to 76 (first to fourth dielectric layers, a lower dielectric layer, and an upper dielectric layer) and five internal electrodes 81 to 85 (first to fifth electrodes).

In addition, in the modified example 2, on the lower dielectric layer 75, the fourth electrode 84, the fourth dielectric layer 74, the third electrode 83, the third dielectric layer 73, the fifth electrode 85, the second dielectric layer 72, the second electrode 82, the first dielectric layer 71, the first electrode 81, and the upper dielectric layer 76 are stacked in the stated order.

The structure of the modified example 2 is the same as that of the second embodiment (FIG. 8) except that a dielectric portion (second dielectric portion) between the second electrode 82 and the third electrode 83 is formed of the second dielectric layer 72, the fifth electrode 85, and the third dielectric layer 73. In addition, the structures of the dielectric layers and the internal electrodes are the same as those of the second embodiment. It should be noted that the dielectric layers have the same thickness. However, the numbers of stacked dielectric layers and stacked internal electrodes between the second electrode 82 and the third electrode 83 can be changed as appropriate in accordance with a purpose, a necessary capacitance, or the like.

In the multilayer capacitor 70 of the modified example 2, the first and fourth electrodes 81 and 84 are connected to one terminal of the signal power source 100 externally provided. The second, third, and fifth electrodes 82, 83, and 85 are connected to the other terminal of the signal power source 100. By connecting the internal electrodes in the above-mentioned manner, the internal capacitor is formed between the first electrode 81 and the second electrode 82, between the third electrode 83 and the fourth electrode 84, between the first electrode 81 and the fifth electrode 85, and between the fourth electrode 84 and the fifth electrode 85, respectively, in the modified example 2.

At this time, in the modified example 2, the internal capacitor having the capacitance C2 is formed between the first electrode 81 and the second electrode 82 and between the third electrode 83 and the fourth electrode 84, respectively. In addition, the distance between the first electrode 81 and the fifth electrode 85 and between the fourth electrode 84 and the fifth electrode 85 is approximately twice the distance between the first electrode 81 and the second electrode 82 and between the third electrode 83 and the fourth electrode 84. Therefore, the internal capacitor formed between the first electrode 81 and the fifth electrode 85 and between the fourth electrode 84 and the fifth electrode 85, respectively, is approximately C2/2.

Figure 15:
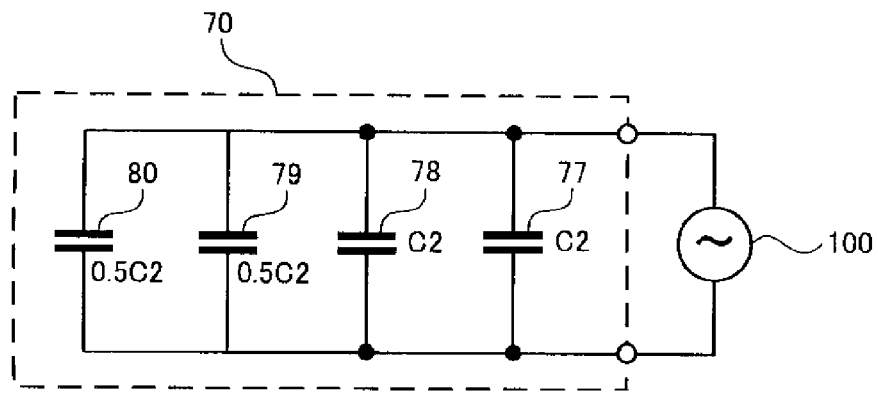
FIG. 15 is a diagram showing an equivalent circuit of the multilayer capacitor of the modified example 2.

FIG. 15 is a diagram showing an equivalent circuit of the multilayer capacitor 70 of the modified example 2. In the modified example 2, the equivalent circuit of the multilayer capacitor 70 is a circuit in which two internal capacitors 77 and 78 each having the capacitance C2 and two internal capacitors 79 and 80 each having the capacitance C2/2 are connected in parallel to the signal power source 100. Therefore, the entire capacitance of the multilayer capacitor 70 of the modified example 2 is 3*C2. That is, the same capacitance as that of the multilayer capacitor 70 in the comparative example 2 can be obtained.

Here, the multilayer capacitor 70 of the modified example 2 and the multilayer capacitor 350 of the comparative example 2 are compared with each other in terms of a relationship between the number of internal electrodes and the capacitance of the entire capacitor. In the multilayer capacitor 70 of the modified example 2, the five internal electrodes constitute the multilayer capacitor having the capacitance of 3*C2. In contrast, in the multilayer capacitor 350 of the comparative example 2, the four internal electrodes constitute the multilayer capacitor having the capacitance 3*C2.

Accordingly, in the case where the multilayer capacitor 350 of the comparative example 2 and the multilayer capacitor 70 of the modified example 2 are manufactured to have the same capacitance, the number of internal electrodes of the multilayer capacitor 70 of the modified example 2 is greater than that of the comparative example 2. Thus, in the modified example 2, the electrode resistance (direct-current resistance) of the entire multilayer capacitor 70 can be further reduced as compared to the comparative example 2. Therefore, the same effect as the second embodiment can be obtained.

Modified Example 3

In the second embodiment and the modified example 2, the example is given in which the internal electrodes and the dielectric layers are alternately stacked. However, the present invention is not limited to this. A pair of internal electrodes to which signals having different polarities are applied may be formed on the same surface. In a modified example 3, such an example will be described.

Figure 16:
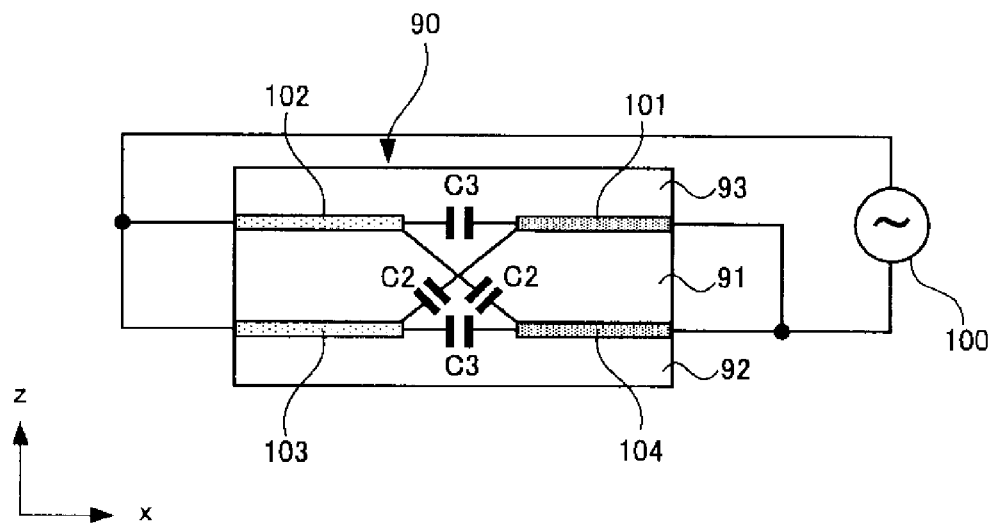
FIG. 16 is a schematic cross-sectional view showing a multilayer capacitor of a modified example 3.

FIG. 16 is a schematic cross-sectional view showing a multilayer capacitor 90 of the modified example 3. The multilayer capacitor 90 of the modified example 3 includes three dielectric layers 91 to 93 (a dielectric layer, a lower dielectric layer, and an upper dielectric layer) and four internal electrodes 101 to 104 (first to fourth electrodes).

In the modified example 3, on a surface of the dielectric layer 91 (second dielectric portion), the first electrode 101 and the second electrode 102 are formed at a predetermined interval, and on the other surface, the third electrode 103 and the fourth electrode 104 are formed at a predetermined interval. Further, in the modified example 3, the upper dielectric layer 93 is disposed on a side (upper side in FIG. 16) of the dielectric layer 91, and the lower dielectric layer 92 is disposed on the other side (lower side in FIG. 16) of the dielectric layer 91.

In the modified example 3, the structures (shape, size, formation material, and the like) of the dielectric layer 91, the lower dielectric layer 92, and the upper dielectric layer 93 are set to be the same as those of the second dielectric layer 52, the lower dielectric layer 54, and the upper dielectric layer 55 of the multilayer capacitor 50 of the second embodiment. Further, the structures (shape, size, formation material, and the like) of the first to fourth electrodes 101 to 104 are set to be the same as those of the first to fourth electrodes 61 to 64 of the multilayer capacitor 50 of the second embodiment.

FIGS. 17A and 17B are exploded views each showing the multilayer capacitor 90 of the modified example 3. In FIGS. 17A and 17B, for ease of explanation, the upper dielectric layer 93 is not shown. FIG. 17A shows an electrode structure of the first and second electrodes 101 and 102 formed on the dielectric layer 91. FIG. 17B shows an electrode structure of the third and fourth electrodes 103 and 104 formed on the lower dielectric layer 92.

The first electrode 101 has a T-letter surface shape and is constituted of an electrode portion 101a and a terminal portion 101b. The terminal portion 101b is formed along a short side (right short side in FIG. 17A) of the dielectric layer 91 having a rectangular shape. The electrode portion 101a is extended from the center of the terminal portion 101b in a perpendicular direction (x direction in FIG. 17A) to the extended direction (y direction in FIG. 17A) of the terminal portion 101b.

The second electrode 102 has a T-letter surface shape and is constituted of an electrode portion 102a and a terminal portion 102b. The terminal portion 102b is formed along the other short side (left short side in FIG. 17A) of the dielectric layer 91 having the rectangular shape. The electrode portion 102a is extended from the center of the terminal portion 102b in a perpendicular direction (x direction in FIG. 17A) to the extended direction (y direction in FIG. 17B) of the terminal portion 102b.

The third electrode 103 has a T-letter surface shape and is constituted of an electrode portion 103a and a terminal portion 103b. The terminal portion 103b is formed along a short side (left short side in FIG. 17B) of the lower dielectric layer 92 having a rectangular shape. The electrode portion 103a is extended from the center of the terminal portion 103b in a perpendicular direction (x direction in FIG. 17B) to the extended direction (y direction in FIG. 17B) of the terminal portion 103b. In addition, the third electrode 103 is disposed at a position opposed to the second electrode 102 with the dielectric layer 91 being sandwiched therebetween.

The fourth electrode 104 has a T-letter surface shape and is constituted of an electrode portion 104a and a terminal portion 104b. The terminal portion 104b is formed along the other short side (right short side in FIG. 17B) of the lower dielectric layer 92 having the rectangular shape. The electrode portion 104a is extended from the center of the terminal portion 104b in a perpendicular direction (x direction in FIG. 17B) to the extended direction (y direction in FIG. 17B) of the terminal portion 104b. In addition, the fourth electrode 104 is disposed at a position opposed to the first electrode 101 with the dielectric layer 91 being sandwiched therebetween.

Further, in the multilayer capacitor 90 of the modified example 3, as shown in FIG. 16, the first electrode 101 and the fourth electrode 104 are connected to one terminal of the signal power source 100 externally provided, and the second electrode 102 and the third electrode 103 are connected to the other terminal of the signal power source 100.

By connecting the first to fourth electrodes 101 to 104 to the signal power source 100 in the above-mentioned manner, internal capacitors having the same capacitance (C2) are formed between the first electrode 101 and the third electrode 103 and between the second electrode 102 and the fourth electrode 104 in the modified example 3. Further, in the modified example 3, internal capacitors having the same capacitance (C3) are formed between the first electrode 101 and the second electrode 102 (first dielectric portion) formed on the same surface and between the third electrode 103 and the fourth electrode 104 (third dielectric portion) formed on the same surface.

FIG. 18 is a diagram showing an equivalent circuit of the multilayer capacitor 90 of the modified example 3. In the modified example 3, the equivalent circuit of the multilayer capacitor 90 is a circuit in which two internal capacitors 95 and 96 each having the capacitance C2 and two internal capacitors 97 and 98 each having the capacitance C3 are connected in parallel to the signal power source 100. Therefore, the entire capacitance of the multilayer capacitor 90 of the modified example 3 is 2*C2+2*C3.

As described above, in the multilayer capacitor 90 of the modified example 3, the four internal capacitors are formed with respect to the four internal electrodes. However, when the pair of internal electrodes formed on the same surface is structured so that the entire capacitance (2*C3) of the internal capacitors between the pair of internal electrodes formed on the same surface is smaller than the capacitance of C2, the capacitance of the entire multilayer capacitor 90 of the modified example 3 becomes smaller than that of the comparative example 2. To meet this condition, for example, the interval between the pair of internal electrodes formed on the same surface only has to be sufficiently greater than the thickness of the dielectric layer 91.

That is, in the modified example 3, by appropriately setting the interval between the pair of internal electrodes formed on the same surface, the entire capacitance of the multilayer capacitor 90 of the modified example 3 can be set to be smaller than that of the comparative example 2.

In this case, in the case where the multilayer capacitor 350 of the comparative example 2 and the multilayer capacitor 90 of the modified example 3 are manufactured to have the same capacitance, the number of internal electrodes of the multilayer capacitor 90 of the modified example 3 becomes greater than that of the comparative example 2. Therefore, in the modified example 3, the electrode resistance (direct-current resistance) of the entire multilayer capacitor 90 can be further reduced as compared to the comparative example 2, and the same effect as that of the second embodiment can be obtained.

3. Third Embodiment

Influence of Misalignment Between Electrodes

In the first and second embodiments, the example is given in which the extended directions of the electrode portions of the pair of internal electrodes constituting the internal capacitor are parallel to each other. However, in a case where such an electrode structure is used to manufacture a multilayer capacitor having a smaller capacitance, an influence on characteristics due to a misalignment between the pair of internal electrodes is increased. In view of this, a problem caused by the misalignment between the internal electrodes will be described in detail with reference to the drawings, prior to a description on a structure of a multilayer capacitor of this embodiment.

Figure 19:
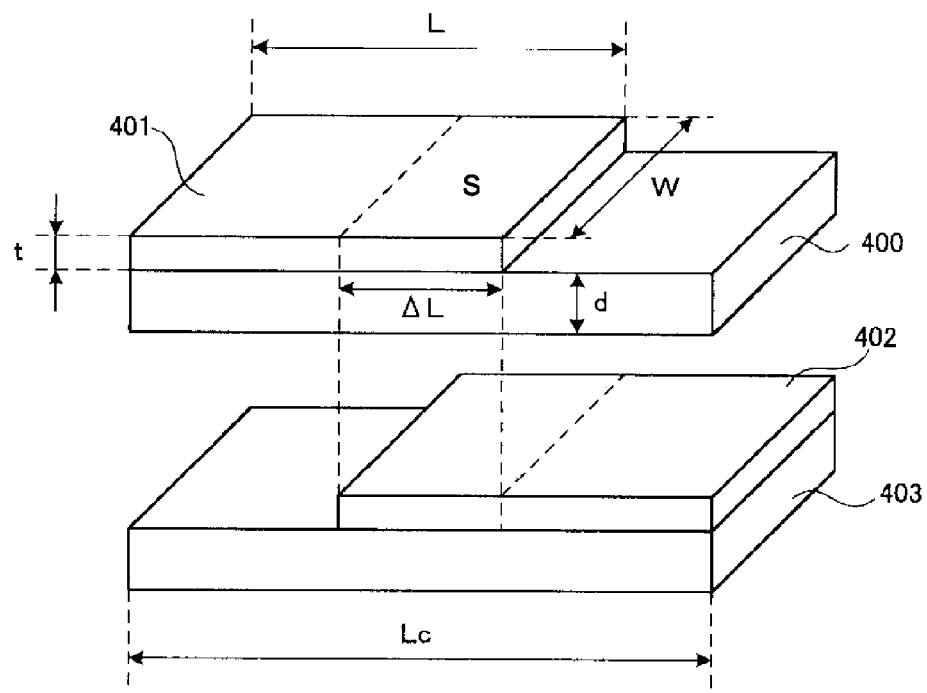
FIG. 19 is a schematic structural diagram showing a general multilayer capacitor.

FIG. 19 is an exploded view showing a schematic structure of a general multilayer capacitor. In general, the multilayer capacitor is constituted of a layer including a plate-like dielectric layer 400 and an upper electrode 401 (internal electrode) and a layer including a plate-like dielectric layer 403 and a lower electrode 402 with the two layers being stacked. The upper electrode 401 is formed on the dielectric layer 400, and the lower electrode 402 is formed on the dielectric layer 403.

On the surface of the dielectric layer 400, the upper electrode 401 is extended from a short side portion of the dielectric layer 400 along a long side thereof by a length L. In addition, the layer including the dielectric layer 403 and the lower electrode 402 has the same structure including the dielectric layer 400 and the upper electrode 401.

Further, the layer including the dielectric layer 400 and the upper electrode 401 and the layer including the dielectric layer 403 and the lower electrode 402 are stacked so that surface portions where the electrodes are not formed (surface areas where the dielectric layers 400 and 403 are exposed) are not overlapped with each other. With this structure, an area where a projection pattern formed at a time when the upper electrode 401 is projected on the lower electrode 402 side and the lower electrode 402 are overlapped (opposite electrode area) is formed.

Here, a capacitance C between the upper electrode 401 and the lower electrode 402 is determined to be $C=\in_0*\in_r*(S/d)$, in which S represents an area of the opposite electrode area, d represents a thickness (distance between the electrodes) of the dielectric layer 400, $\in_r$ represents a relative permittivity of the dielectric layer 400, and $\in_0$ represents a vacuum permittivity. In addition, a direct-current resistance R of the multilayer capacitor is determined to be $R=\rho*L/(W*t*N)$, in which W represents a width of the internal electrodes, t represents a thickness thereof, N represents the number of internal electrodes stacked, and $\rho$ represents a resistivity of the electrode.

Therefore, in the multilayer capacitor, it is necessary to perform at least one of increasing the distance d (thickness of the dielectric layer 400) between the internal electrodes and reducing the area S of the opposite electrode area in order to manufacture the capacitor having the small capacitance. However, in the case where the multilayer capacitor is used as the variable-capacitance capacitor, when the distance d between the internal electrodes is increased, a control voltage for changing the capacitance is increased (to be approximately 50 to 100 V, for example), which is not suitable for the use of a low-voltage drive (for example, approximately 5 V or less). Therefore, to manufacture the capacitor having the small capacitance in the multilayer capacitor, it is necessary to make the area S of the opposite electrode area smaller, that is, necessary to form a smaller electrode.

The area S of the opposite electrode area can be made to be smaller by reducing the length L of the electrode or the width W of the electrode. In this case, the entire size of the electrode becomes smaller, which increases the resistance R (direct-current resistance) of the electrode. In contrast, in the multilayer capacitor, the resistance value is inversely proportional to the number of electrodes stacked. Therefore, by increasing the number of electrodes stacked N, the problem of the resistance R as described above can be overcome.

However, the increase in number of electrodes stacked N in the multilayer capacitor results in increase of the influence on a change in capacitance due to the relative misalignment between the pair of internal electrodes opposed with the dielectric layer in which the internal capacitor is formed being sandwiched therebetween. An amount of the relative misalignment between the pair of internal electrodes opposed with the dielectric layer being sandwiched therebetween and a misalignment direction are changed depending on the accuracy of a manufacturing process (for example, mask alignment) at a time when the electrode is formed.

In the multilayer capacitor, when the misalignment is caused between the pair of internal electrodes opposed with the dielectric layer in which the internal capacitor is formed being sandwiched therebetween, the capacitance is changed for each internal capacitor. As a result, the variation in capacitance of the entire multilayer capacitor becomes larger, which makes it difficult to stably manufacture the multilayer capacitor having a desired capacitance. The misalignment between the internal electrodes is caused not only in the case where the multilayer capacitor is the constant-capacitance capacitor but also in the case where it is the variable-capacitance capacitor.

In view of this, in this embodiment, a description will be given on a structural example of a multilayer capacitor capable of suppressing the variation in capacitance even when the relative misalignment is caused between the pair of internal electrodes constituting the internal capacitor.

(Structure of Multilayer Capacitance Element)

Figure 20:
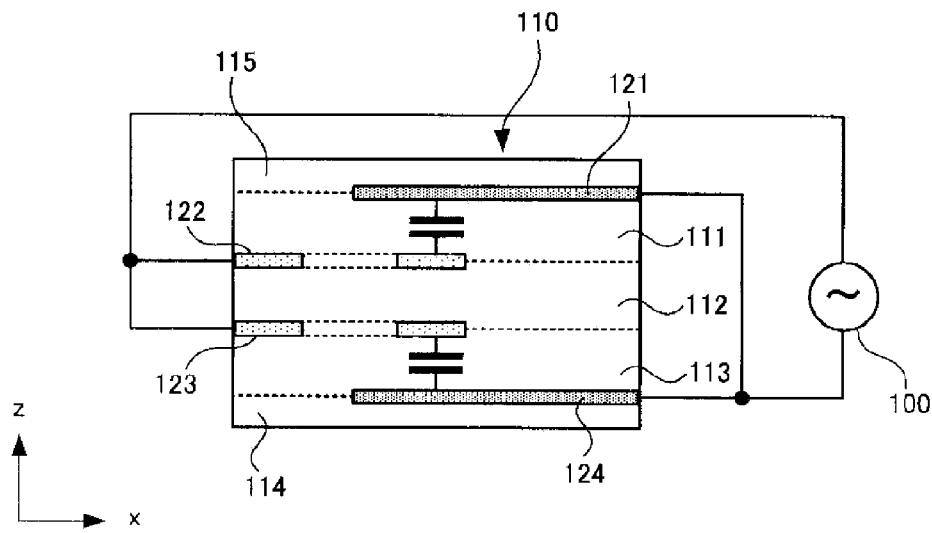
FIG. 20 is a schematic cross-sectional view of a multilayer capacitor according to a third embodiment.

FIG. 20 is a schematic cross-sectional view of a multilayer capacitor according to a third embodiment of the present invention. The structure of the multilayer capacitor of this embodiment can be applied not only to the constant-capacitance capacitor but also to the variable-capacitance capacitor.

A multilayer capacitor 110 (capacitance element) of this embodiment includes five dielectric layers 111 to 115 (first to third dielectric layers, a lower dielectric layer, and an upper dielectric layer) and four internal electrodes 121 to 124 (first to fourth electrodes).

In this embodiment, on the lower dielectric layer 114, the fourth electrode 124, the third dielectric layer 113, the third electrode 123, the second dielectric layer 112, the second electrode 122, the first dielectric layer 111, the first electrode 121, and the upper dielectric layer 115 are stacked in the stated order, thereby constituting the multilayer capacitor 110.

In addition, in the multilayer capacitor 110 of this embodiment, the first and fourth electrodes 121 and 124 are connected to one terminal of the signal power source 100 externally provided, and the second and third electrodes 122 and 123 are connected to the other terminal of the signal power source 100 as shown in FIG. 20. By connecting the first to fourth electrodes 121 to 124 to the signal power source 100 in the above-mentioned manner, in the multilayer capacitor 110, an internal capacitor is formed between the first electrode 121 and the second electrode 122 and between the third electrode 123 and the fourth electrode 124, respectively. It should be noted that signals having the same polarity are applied to the second and third electrodes 122 and 123 formed with the second dielectric layer 112 being sandwiched therebetween, so the internal capacitor is not formed between the second and third electrodes 122 and 123.

First, the structure of the dielectric layers will be described. The first to third dielectric layers 111 to 113 (first to third dielectric portions), the lower dielectric layer 114, and the upper dielectric layer 115 each have a rectangular upper surface (lower surface). The ratio of the long side to the short side of the rectangular surface can be set to 2:1, for example.

In this embodiment, as shown in FIG. 20, the first to third dielectric layers 111 to 113 are set to have the same thickness (for example, approximately 2 µm). However, the present invention is not limited to this. The thicknesses of the first to third dielectric layers 111 to 113 may be set as appropriate in accordance with a purpose, a necessary capacitance, or the like. For example, the thicknesses of the first to third dielectric layers 111 to 113 may be set to be different from one another, or only the thickness of the second dielectric layer 112 may be set to be less than the thicknesses of the first and third dielectric layers 111 and 113. It is desirable to set the thickness of the second dielectric layer 112 in which the internal capacitor is not formed to be less than the thicknesses of the first and third dielectric layers 111 and 113 in terms of the reduction in thickness (reduction in size) of the multilayer capacitor 110.

Further, in this embodiment, the first to third dielectric layers 111 to 113, the lower dielectric layer 114, and the upper dielectric layer 115 are made of the same dielectric material. The dielectric layers may be made of different dielectric materials. However, in terms of facilitation of manufacture, the first to third dielectric layers 111 to 113, the lower dielectric layer 114, and the upper dielectric layer 115 are desirable to be made of the same dielectric material as in this embodiment. It should be noted that as the material of the dielectric layers of this embodiment, the same material as that of the dielectric layers in the first embodiment can be used.

Figure 21A:
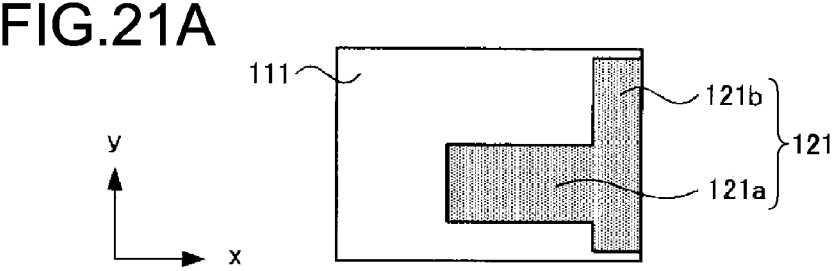
FIGS. 21A to 21D are exploded views each showing the multilayer capacitor according to the third embodiment.
Figure 21B:
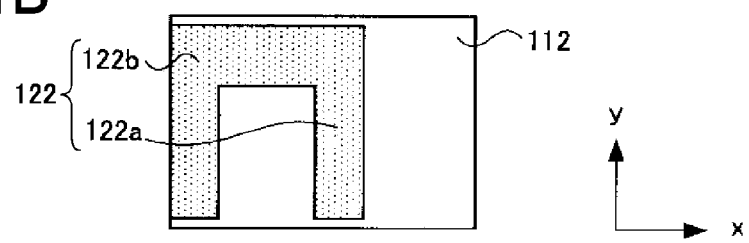
Figure 21C:
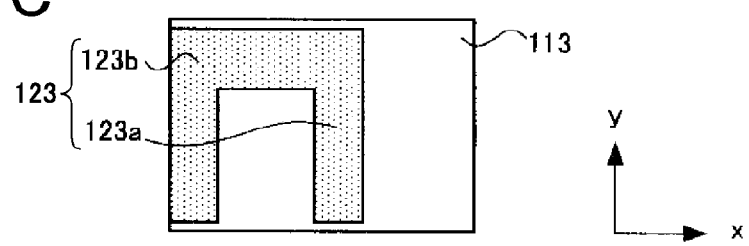
Figure 21D:
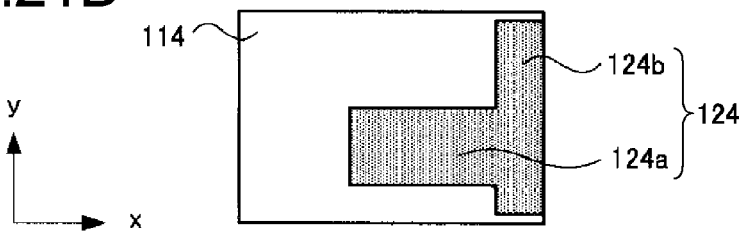

Next, the structures of the internal electrodes will be described. FIGS. 21A to 21D are exploded views each showing the multilayer capacitor 110 of this embodiment. It should be noted that in FIGS. 21A to 21D, the upper dielectric layer 115 is not shown for ease of explanation. FIG. 21A shows an electrode structure of the first electrode 121 formed on the first dielectric layer 111. FIG. 21B shows an electrode structure of the second electrode 122 formed on the second dielectric layer 112. FIG. 21C shows an electrode structure of the third electrode 123 formed on the third dielectric layer 113. FIG. 21D shows an electrode structure of the fourth electrode 124 formed on the lower dielectric layer 114.

The first electrode 121 has an approximately L-letter shape and is constituted of a terminal portion 121b and an electrode portion 121a. The terminal portion 121b is formed along a short side (right short side in FIG. 21A) of the first dielectric layer 111. The electrode portion 121a is extended from a long side (lower position on a long side in FIG. 21A) of the terminal portion 121b in a perpendicular direction (x direction (first direction) in FIG. 21A) to the extended direction (y direction in FIG. 21A) of the terminal portion 121b.

The second electrode 122 has an approximately U-letter shape and is constituted of a terminal portion 122b and an electrode portion 122a. The terminal portion 122b has an L-letter shape and is formed of a short-side portion formed along a short side (left short side in FIG. 21B) of the second dielectric layer 112 on the other side and a long-side portion formed along a long side (upper long side in FIG. 21B) of the second dielectric layer 112. Further, the electrode portion 122a is extended from an end portion of the long-side portion of the terminal portion 122b in a perpendicular direction (y direction (second direction) in FIG. 21B) to the extended direction (x direction in FIG. 21B) of the long-side portion. That is, in this embodiment, the extended direction of the electrode portion 122a of the second electrode 122 and the extended direction of the electrode portion 121a of the first electrode 121 are perpendicular to each other.

The third electrode 123 has an approximately U-letter shape like the second electrode 122, and is constituted of a terminal portion 123b and an electrode portion 123a. The terminal portion 123b has an L-letter shape and is formed of a short-side portion formed along a short side (left short side in FIG. 21C) of the third dielectric layer 113 on the other side and a long-side portion formed along a long side (upper long side in FIG. 21C) of the third dielectric layer 113. Further, the electrode portion 123a is extended from an end portion of the long-side portion of the terminal portion 123b in a perpendicular direction (y direction (second direction) in FIG. 21C) to the extended direction (x direction in FIG. 21C) of the long-side portion. Further, the third electrode 123 is disposed so as to be opposed to the second electrode 122 with the second dielectric layer 112 being sandwiched therebetween.

The fourth electrode 124 has an approximately L-letter shape like the first electrode 121, and is constituted of a terminal portion 124b and an electrode portion 124a. The terminal portion 124b is formed along a short side (right short side in FIG. 21D) of the lower dielectric layer 114. The electrode portion 124a is extended from a long side (lower position on a long side in FIG. 21D) of the terminal portion 124b in a perpendicular direction (x direction (first direction) in FIG. 21D) to the extended direction (y direction in FIG. 21D) of the terminal portion 124b. That is, in this embodiment, the extended direction of the electrode portion 124a of the fourth electrode 124 and the extended direction of the electrode portion 123a of the third electrode 123 are perpendicular to each other. In addition, the fourth electrode 124 is disposed so as to be opposed to the first electrode 121 with the first to third dielectric layers 111 to 113 being sandwiched therebetween.

The first to fourth electrodes 121 to 124 can be formed of the same material as the internal electrodes described in the first embodiment. The multilayer capacitor 110 of this embodiment can be manufactured in the same way as in the first embodiment.

In addition, in this embodiment, the first to fourth electrodes 121 to 124 are set to have the same thickness. The first to fourth electrodes 121 to 124 may have different thicknesses, or the thickness may be changed for each pair of the internal electrodes constituting the internal capacitors in accordance with a purpose or the like.

Further, the multilayer capacitor 110 is provided with a pair of external terminals (not shown). The pair of external terminals is connected to a pair of terminals of the signal power source 100 through a lead or the like. The terminal portion 121b of the first electrode 121 and the terminal portion 124b of the fourth electrode 124 are connected to one external terminal, and the terminal portion 122b of the second electrode 122 and the terminal portion 123b of the third electrode 123 are connected to the other external terminal. However, the external terminal may be provided for each of the internal electrodes, and electrical connection between the first electrode 121 and the fourth electrode 124 and between the second electrode 122 and the third electrode 123 may be established through a circuit wiring when the capacitors are mounted on the circuit.

In addition, in the case where the multilayer capacitor 110 of this embodiment is used as the variable-capacitance capacitor, the pair of external terminals is also connected to the terminal of a control power source in addition to the signal power source 100. In this case, the multilayer capacitor 110 is connected to the signal power source 100 through a bias elimination capacitor and connected to the control power source through a current-limiting resistor.

(Design Outline of Internal Electrode)

Next, a description will be given on a design outline of the internal electrodes of the multilayer capacitor 110 of this embodiment. In the multilayer capacitor 110 of this embodiment, the pair of internal electrodes (for example, the first electrode 121 and second electrode 122) constituting the internal capacitor is disposed at a position where the electrode portions of the pair of internal electrodes are intercrossed in the thickness direction of the dielectric layer.

That is, in this embodiment, the internal electrodes are structured so that, at a time when one of the pair of internal electrodes constituting the internal capacitor is projected on the formation surface of the other internal electrode, the projection pattern of the electrode portion of the one internal electrode intercrosses the electrode portion of the other internal electrode.

In addition, in this embodiment, the structure (shape, size, and the like) of each of the internal electrodes is set in consideration of a necessary amount, a resistance value, and an amount of maximum misalignment between the electrodes that is expected.

Figure 22:
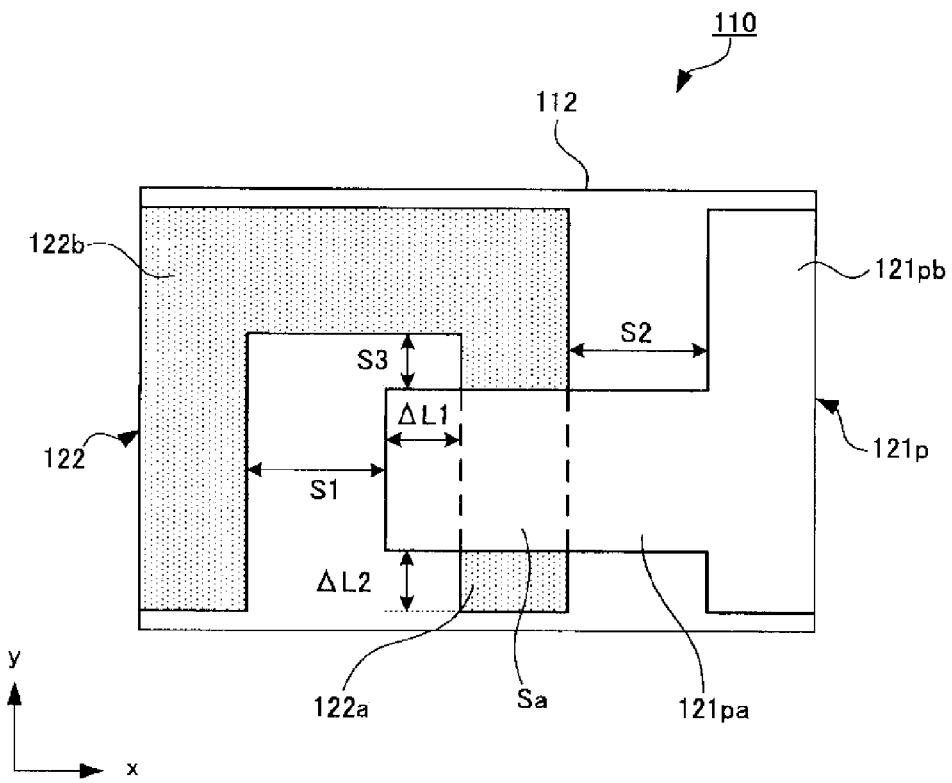
FIG. 22 is a schematic cross-sectional view of internal electrodes of the multilayer capacitor according to the third embodiment.

Here, the design outline of the multilayer capacitor 110 of this embodiment for coping with the misalignment will be described in more detail with reference to FIG. 22. FIG. 22 is a diagram showing a state where a projection pattern 121p of the first electrode 121, which is formed when the first electrode 121 is projected on formation surface of the second electrode 122, is overlapped with the second electrode 122, out of the first electrode 121 and the second electrode 122 formed with the first dielectric layer 111 being sandwiched therebetween.

In this embodiment, main size parameters ($\Delta L1$, $\Delta L2$, and S1 to S3) indicated in FIG. 22 are set so as not to cause the area of an opposite electrode area Sa to change even when the amount of misalignment reaches a maximum in the long-side direction (x direction) and the short-side direction (y direction) of the second dielectric layer 112. More specifically, the shapes and the disposed positions of the internal electrodes are set so that the size parameters ($\Delta L1$, $\Delta L2$, and S1 to S3) indicated in FIG. 22 meet the following conditions, for example.

It should be noted that $\Delta L1$ indicated in FIG. 22 is a distance between an end of an electrode portion 121pa of the projection pattern 121p of the first electrode 121 and the electrode portion 122a of the second electrode 122, and $\Delta L2$ is a distance between an end of the electrode portion 122a of the second electrode 122 and the electrode portion 121pa of the projection pattern 121p of the first electrode 121. S1 is a distance between an end of the electrode portion 121pa of the projection pattern 121p of the first electrode 121 and the short-side portion of the terminal portion 122b of the second electrode 122. S2 is a distance between a terminal portion 121pb of the projection pattern 121p of the first electrode 121 and the electrode portion 122a of the second electrode 122. S3 is a distance between the electrode portion 121pa of the projection pattern 121p of the first electrode 121 and the long-side portion of the terminal portion 122b of the second electrode 122.

In this embodiment, the structures of the first electrode 121 and the second electrode 122 are designed so that ΔL1≥0, ΔL2≥0, S1≥0, S2≥0, and S3≥0 are satisfied even in the case where the amount of relative misalignment between the first electrode 121 and the second electrode 122 reaches a maximum value expected. The third and fourth electrodes 123 and 124 are designed in the same way as the first and second electrodes 121 and 122. The shapes of the internal electrodes can be arbitrarily set as long as the conditions of the design outline described above are satisfied.

By designing the internal electrodes so that the size parameters (ΔL1, ΔL2, and S1 to S3) indicated in FIG. 22 satisfy the above-mentioned conditions, the area of the opposite electrode area Sa is not changed even if the misalignment is caused between the pair of internal electrodes constituting the internal capacitor. Therefore, in this embodiment, even in the case where the multilayer capacitor having the smaller capacitance is manufactured, the multilayer capacitor 110 having a desired capacitance can be stably manufactured regardless of the misalignment of the pair of internal electrodes opposed with the dielectric layer being sandwiched therebetween.

Further, in this embodiment, by reducing the width of the electrode portion of the pair of internal electrodes constituting the internal capacitor, the multilayer capacitor having the smaller capacitance can be easily manufactured.

Furthermore, in this embodiment, the area of the opposite electrode area Sa can be kept constant (capacitance is kept constant), even if the misalignment is caused between the pair of internal electrodes constituting the internal capacitor. Accordingly, the electrode area per internal capacitor can be reduced, and the number of layers stacked can be increased. As a result, it is possible to further increase the capacitance of the entire multilayer capacitor and further reduce the electrode resistance. In addition, in this embodiment, the electrode can be easily formed at a low cost.

In the multilayer capacitor 110 of this embodiment, the layer in which the internal capacitor is formed and the layer in which the internal capacitor is not formed are alternately stacked as shown in FIG. 20 as in the first embodiment (FIG. 1). Therefore, in this embodiment, the same effect as the first embodiment can be obtained.

Modified Example 4

The structure of the multilayer capacitor in which the extended directions of the respective electrode portions of the internal electrodes constituting the internal capacitor are intercrossed is not limited to the structural example of the third embodiment. In a modified example 4, various modified examples of such a multilayer capacitor will be described. It should be noted that the structure of a multilayer capacitor of the modified example 4 is the same as that of the third embodiment (FIGS. 20 and 21) except the structure of the internal electrodes.

(1) Modified Example 4-1

Figure 23:
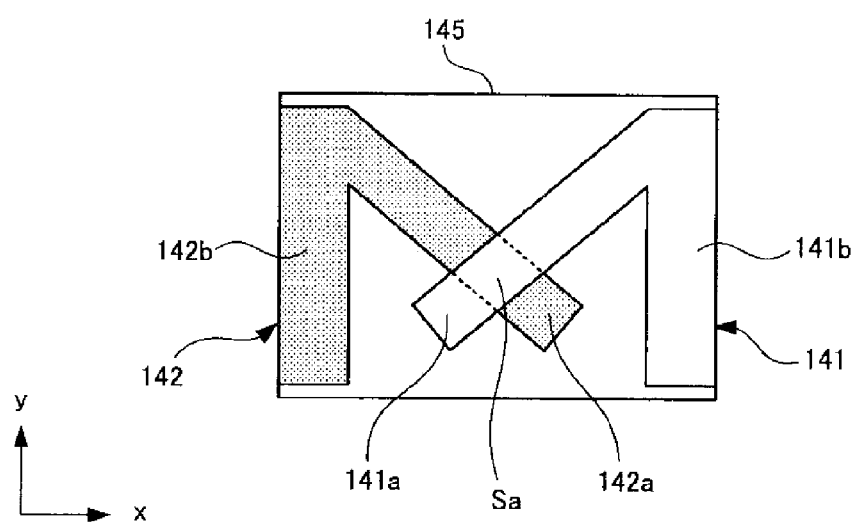
FIG. 23 is a schematic structural diagram showing internal electrodes of a multilayer capacitor of a modified example 4-1.

FIG. 23 is a diagram showing a schematic structure of a pair of internal electrodes constituting an internal capacitor in a multilayer capacitor of a modified example 4-1. It should be noted that in FIG. 23, top views of the pair of internal electrodes (upper electrode 141 and lower electrode 142) constituting the internal capacitor and a top view of a dielectric layer 145 are superposed for ease of explanation.

The upper electrode 141 has a V-letter shape and is constituted of an electrode portion 141a and a terminal portion 141b. The terminal portion 141b is formed along a short side (right short side in FIG. 23) of the dielectric layer 145. Further, the electrode portion 141a is extended from an end portion of the terminal portion 141b in a diagonal direction (direction that is not perpendicular) to an extended direction (y direction in FIG. 23) of the terminal portion 141b. In FIG. 23, the electrode portion 141a is extended from the upper right corner of the surface of the dielectric layer 145 toward the lower left corner thereof.

The lower electrode 142 has a V-letter shape. The lower electrode 142 and the upper electrode 141 are symmetrical with respect to the y direction of FIG. 23. The lower electrode 142 is constituted of an electrode portion 142a and a terminal portion 142b. The terminal portion 142b is formed along the other short side (left short side in FIG. 23) of the dielectric layer 145. Further, the electrode portion 142a is extended from an end portion of the terminal portion 142b in a diagonal direction (direction that is not perpendicular) to an extended direction (y direction in FIG. 23) of the terminal portion 142b. In FIG. 23, the electrode portion 142a is extended from the upper left corner of the surface of the dielectric layer 145 toward the lower right corner thereof.

In the modified example 4-1, the extended direction of the electrode portion 142a of the lower electrode 142 and the extended direction of the electrode portion 141a of the upper electrode 141 are set so as not to be perpendicular to each other. In addition, in this example, the size and the like of the upper electrode 141 and the lower electrode 142 are set so that a part of the electrode portion 141a of the upper electrode 141 and a part of the electrode portion 142a of the lower electrode 142 are opposed in the thickness direction of the dielectric layer 145 (so that the opposite electrode area Sa is formed). Further, in this example, as in the third embodiment, the size, shape, disposed position, and the like of the upper electrode 141 and the lower electrode 142 are set so as not to change the opposite electrode area Sa even if the amount of misalignment reaches the maximum in the long-side direction (x direction) and the short-side direction (y direction) of the dielectric layer 145.

(2) Modified Example 4-2

Figure 24:
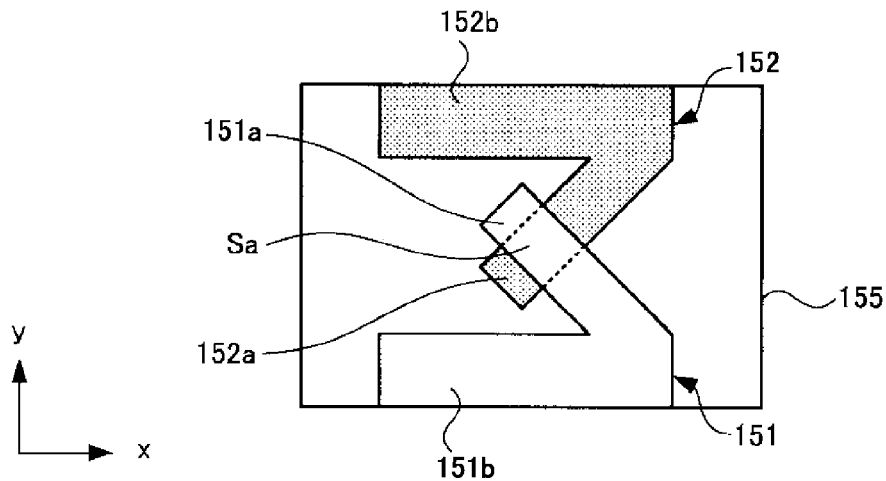
FIG. 24 is a schematic structural diagram showing internal electrodes of a multilayer capacitor of a modified example 4-2.

FIG. 24 is a diagram showing a schematic structure of a pair of internal electrodes constituting an internal capacitor in a multilayer capacitor of a modified example 4-2. It should be noted that in FIG. 24, top views of the pair of internal electrodes (upper electrode 151 and lower electrode 152) constituting the internal capacitor and a top view of a dielectric layer 155 are superposed for ease of explanation.

The upper electrode 151 has a V-letter shape and is constituted of an electrode portion 151a and a terminal portion 151b. The terminal portion 151b is formed along a long side (lower long side in FIG. 24) of the dielectric layer 155. Further, the electrode portion 151a is extended from an end portion of the terminal portion 151b in a diagonal direction (direction that is not perpendicular) to an extended direction (x direction in FIG. 24) of the terminal portion 151b. In FIG. 24, the electrode portion 151a is extended from the lower right corner of the surface of the dielectric layer 155 toward the upper left corner thereof.

The lower electrode 152 has a V-letter shape. The lower electrode 152 and the upper electrode 151 are symmetrical with respect to the x direction of FIG. 24. The lower electrode 152 is constituted of an electrode portion 152a and a terminal portion 152b. The terminal portion 152b is formed along the other long side (upper long side in FIG. 24) of the dielectric layer 155. Further, the electrode portion 152a is extended from an end portion of the terminal portion 152b in a diagonal direction (direction that is not perpendicular) to an extended direction (x direction in FIG. 24) of the terminal portion 152b. In FIG. 24, the electrode portion 152a is extended from the upper right corner of the surface of the dielectric layer 155 toward the lower left corner thereof.

In the modified example 4-2, the extended direction of the electrode portion 152a of the lower electrode 152 and the extended direction of the electrode portion 151a of the upper electrode 151 are set so as to be perpendicular to each other. In addition, in this example, the size and the like of the upper electrode 151 and the lower electrode 152 are set so that a part of the electrode portion 151a of the upper electrode 151 and a part of the electrode portion 152a of the lower electrode 152 are opposed in the thickness direction of the dielectric layer 155 (so that the opposite electrode area Sa is formed). Further, in this example, as in the third embodiment, the size, shape, disposed position, and the like of the upper electrode 151 and the lower electrode 152 are set so as not to change the opposite electrode area Sa even if the amount of misalignment reaches the maximum in the long-side direction (x direction) and the short-side direction (y direction) of the dielectric layer 155.

In the modified example 4-2, the terminal portions of the upper electrode 151 and the lower electrode 152 are formed in the vicinity of the extended direction (x direction) of the long side of the dielectric layer 155 therealong. Therefore, the electrode portions of the upper electrode 151 and the lower electrode 152 can be shorter than those in the modified example 4-1. Thus, in the modified example 4-2, the electrode resistance value of the multilayer capacitor can be further reduced.

(3) Modified Example 4-3

Figure 25:
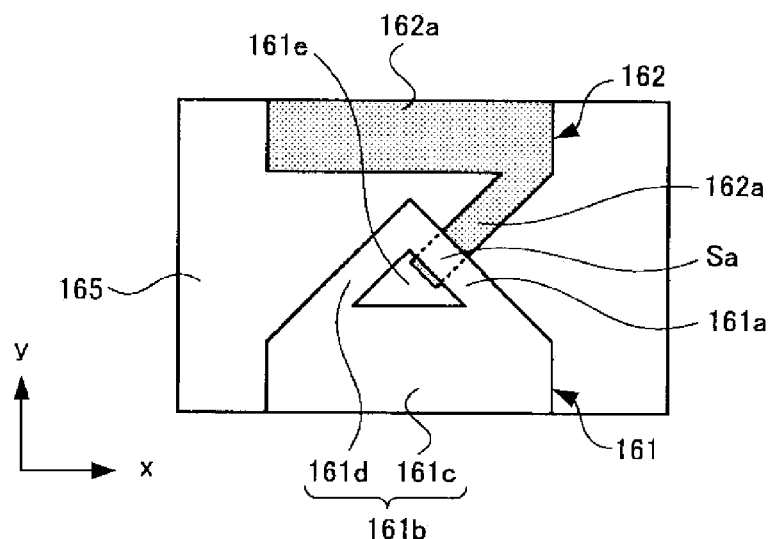
FIG. 25 is a schematic structural diagram showing internal electrodes of a multilayer capacitor of a modified example 4-3.

FIG. 25 is a diagram showing a schematic structure of a pair of internal electrodes constituting an internal capacitor in a multilayer capacitor of a modified example 4-3. In FIG. 25, top views of the pair of internal electrodes (upper electrode 161 and lower electrode 162) constituting the internal capacitor and a top view of a dielectric layer 165 are superposed for ease of explanation.

First, the structure of the upper electrode 161 will be described. The upper electrode 161 has an approximately triangular shape and is constituted of an electrode portion 161a and a terminal portion 161b. The electrode portion 161a is extended in a diagonal direction (direction that is not perpendicular) with respect to a direction (x direction in FIG. 25) along a long side of the dielectric layer 165. Specifically, in FIG. 25, the electrode portion 161a is extended in a direction along a line joining the upper left corner of the surface of the dielectric layer 165 to the lower right corner opposed thereto.

The terminal portion 161b is constituted of a first terminal portion 161c and a second terminal portion 161d. The first terminal portion 161c is formed in the vicinity of a long side (lower long side in FIG. 25) of the dielectric layer 165 therealong. Further, an end portion of the first terminal portion 161c is connected to an end portion of the electrode portion 161a.

Further, the second terminal portion 161d is extended in a diagonal direction (direction that is not perpendicular) with respect to the direction (x direction in FIG. 25) along the long side of the dielectric layer 165 and in a direction that intercrosses the extended direction of the electrode portion 161a. In FIG. 25, the second terminal portion 161d is extended in a direction along a line joining the upper right corner of the surface of the dielectric layer 165 to the lower left corner opposed thereto. Further, an end portion of the second terminal portion 161d is connected to the other end portion (end portion on the side not connected to the first terminal portion 161c) of the first terminal portion 161a, and the other end portion of the second terminal portion 161d is connected to the other end portion of the first terminal portion 161c.

By forming the electrode portion 161a, the first terminal portion 161c, and the second terminal portion 161d as described above, a triangular opening portion 161e is formed in the upper electrode 161. It should be noted that the shape of the opening portion 161e is not limited to this, and any shape can be used.

Next, the structure of the lower electrode 162 will be described. The lower electrode 162 has a V-letter shape, and is constituted of an electrode portion 162a and a terminal portion 162b. The lower electrode 162 has the same structure as the lower electrode 152 described in the modified example 4-2 (FIG. 24).

In the modified example 4-3, the extended direction of the electrode portion 162a of the lower electrode 162 and the extended direction of the electrode portion 161a of the upper electrode 161 are set so as to be approximately perpendicular to each other. In addition, in this example, the size and the like of the upper electrode 161 and the lower electrode 162 are set so that a part of the electrode portion 161a of the upper electrode 161 and a part of the electrode portion 162a of the lower electrode 162 are opposed in the thickness direction of the dielectric layer 165 (so that the opposite electrode area Sa is formed). Further, in this example, as in the third embodiment, the size, shape, disposed position, and the like of the upper electrode 161 and the lower electrode 162 are set so as not to change the opposite electrode area Sa even if the amount of misalignment reaches the maximum in the long-side direction (x direction) and the short-side direction (y direction) of the dielectric layer 165.

In the modified example 4-3, the area of the terminal portion 161b of the upper electrode 161 can be increased, with the result that the electrode resistance value of the multilayer capacitor can be further reduced.

(4) Modified Example 4-4

Figure 26:
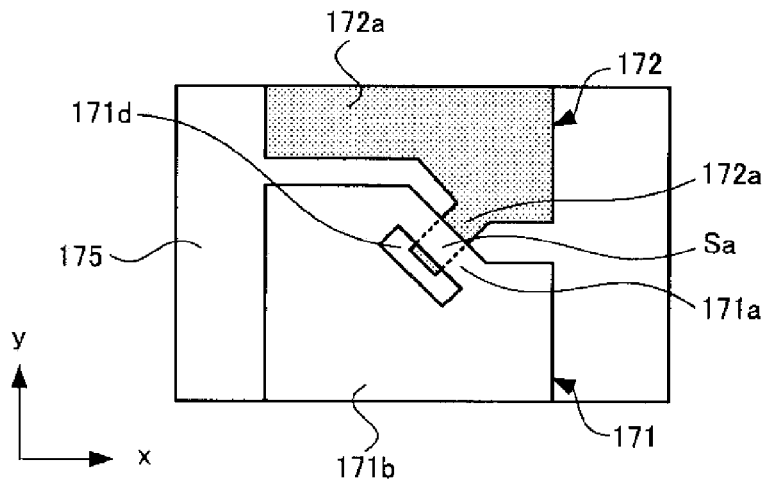
FIG. 26 is a schematic structural diagram showing internal electrodes of a multilayer capacitor of a modified example 4-4.

FIG. 26 is a diagram showing a schematic structure of a pair of internal electrodes constituting an internal capacitor in a multilayer capacitor of a modified example 4-4. In FIG. 26, top views of the pair of internal electrodes (upper electrode 171 and lower electrode 172) constituting the internal capacitor and a top view of a dielectric layer 175 are superposed for ease of explanation.

First, the structure of the upper electrode 171 will be described. The upper electrode 171 is constituted of an electrode portion 171a and a terminal portion 171b. The electrode portion 171a is extended in a diagonal direction (direction that is not perpendicular) to a direction (x direction in FIG. 26) along a long side of the dielectric layer 175. Specifically, in FIG. 26, the electrode portion 171a is extended in a direction along a line joining the upper left corner of the surface of the dielectric layer 175 to the lower right corner opposed thereto.

The terminal portion 171b has an approximately L-letter shape. The base portion thereof is formed in the vicinity of a long side (lower long side in FIG. 26) of the dielectric layer 175 therealong. Further, an end portion of the terminal portion 171 having the approximately L-letter shape is connected with an end portion of the electrode portion 171a, and the other end portion is connected with the other end portion of the electrode portion 171a. As a result, the electrode portion 171a and the terminal portion 171b form a rectangular opening portion 171d in the upper electrode 171. It should be noted that the shape of the opening portion 171d is not limited to this, and any shape can be used.

Next, the structure of the lower electrode 172 will be described. The lower electrode 172 is constituted of an electrode portion 172a and a terminal portion 172b. The electrode portion 172a is extended in a diagonal direction (direction that is not perpendicular) to a direction (x direction in FIG. 26) along the long side of the dielectric layer 175. Specifically, in FIG. 26, the electrode portion 172a is extended in a direction from the upper right corner of the surface of the dielectric layer 175 toward the lower left corner opposed thereto.

The terminal portion 172b has an approximately L-letter shape, and the base portion thereof is formed in the vicinity of the other long side (upper long side in FIG. 26) of the dielectric layer 175 therealong. Further, to an end portion opposed to the base portion of the terminal portion 172b, an end portion of the electrode portion 172a is connected.

In the modified example 4-4, the extended direction of the electrode portion 172a of the lower electrode 172 and the extended direction of the electrode portion 171a of the upper electrode 171 are set so as to be approximately perpendicular to each other. In addition, in this example, the size and the like of the upper electrode 171 and the lower electrode 172 are set so that a part of the electrode portion 171a of the upper electrode 171 and a part of the electrode portion 172a of the lower electrode 172 are opposed in the thickness direction of the dielectric layer 175 (so that the opposite electrode area Sa is formed). Further, in this example, as in the third embodiment, the size, shape, disposed position, and the like of the upper electrode 171 and the lower electrode 172 are set so as not to change the opposite electrode area Sa even if the amount of misalignment reaches the maximum in the long-side direction (x direction) and the short-side direction (y direction) of the dielectric layer 175.

In the modified example 4-4, the area of the terminal portion 171b of the upper electrode 171 can be increased, and the length of the electrode portion 172a of the lower electrode 172 in the extended direction can be further reduced. As a result, in this example, the electrode resistance of the multi-layer capacitor can be further reduced.

(5) Modified Example 4-5

In the third embodiment and the modified examples 4-1 to 4-4, given are the examples in consideration of the misalignment in both of the long-side direction and the short-side direction of each of the dielectric layers. However, in some cases, a misalignment in one of the x direction and the y direction may be significantly caused depending on an apparatus and a manufacturing process for positioning the upper electrode and the lower electrode. In such cases, it is only necessary to take into consideration the influence of the misalignment between the upper electrode and the lower electrode only in the x or y direction. In the modified example 4-5, a description will be given on a structural example of a multilayer capacitor that is applicable to a case where the misalignment is significantly caused only in the y direction (short-side direction of the dielectric layer).

Figure 27:
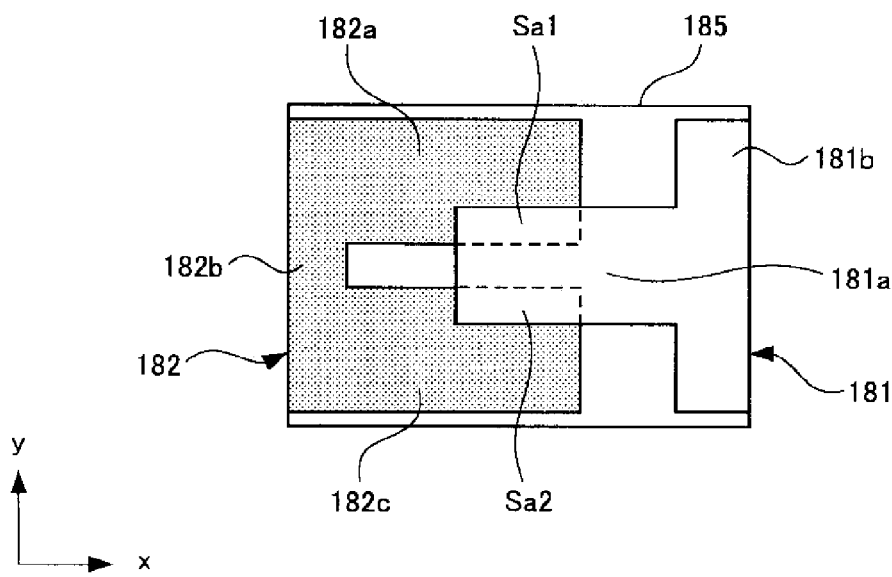
FIG. 27 is a schematic structural diagram showing internal electrodes of a multilayer capacitor of a modified example 4-5.

FIG. 27 is a diagram showing a schematic structure of a pair of internal electrodes constituting an internal capacitor in a multilayer capacitor of the modified example 4-5. It should be noted that in FIG. 27, top views of the pair of internal electrodes (upper electrode 181 and lower electrode 182) constituting the internal capacitor and a top view of a dielectric layer 185 are superposed for ease of explanation.

The upper electrode 181 has a T-letter shape and is constituted of an electrode portion 181a and a terminal portion 181b. The terminal portion 181b is formed in the vicinity of a short side (right short side in FIG. 27) of the dielectric layer 185 therealong. Further, the electrode portion 181a is extended from the center of the terminal portion 181b in a perpendicular direction (x direction in FIG. 27) to the extended direction (y direction in FIG. 27) of the terminal portion 181b.

The lower electrode 182 has an approximately U-letter shape and is constituted of two electrode portions 182a and 182c and a terminal portion 182b. The terminal portion 182b is formed in the vicinity of the other short side (left short side in FIG. 27) of the dielectric layer 185 therealong. The electrode portions 182a and 182c are extended in a perpendicular direction (x direction in FIG. 27) to the extended direction (y direction in FIG. 27) of the terminal portion 182b from the both ends of the terminal portions 182b, respectively. The electrode portions 182a and 182c have the same shape. That is, the extended direction of the electrode portions 182a and 182c of the lower electrode 182 are parallel to the extended direction of the electrode portion 181a of the upper electrode 181.

In the modified example 4-5, the internal electrodes are formed so that a plurality of opposite electrode areas (Sa1 and Sa2 in FIG. 27) are formed between the upper electrode 181 and the lower electrode 182. Specifically, the size and the like of the upper electrode 181 and the lower electrode 182 are set so that the electrode portion 181a of the upper electrode 181 is opposed to the electrode portions 182a and 182c of the lower electrode 182 in the thickness direction of the dielectric layer 185. Further, in this example, the size, shape, disposed position, and the like of the upper electrode 181 and the lower electrode 182 are set so as not to change the total area of the two opposite electrode areas Sa1 and Sa2 even if the amount of misalignment reaches the maximum in the short-side direction (y direction) of the dielectric layer 185.

4. Fourth Embodiment

In a fourth embodiment, a description will be given on a structural example of a non-contact reception apparatus including the multilayer capacitor according to the above embodiments.

(Structure of Non-Contact Reception Apparatus)

Figure 28:
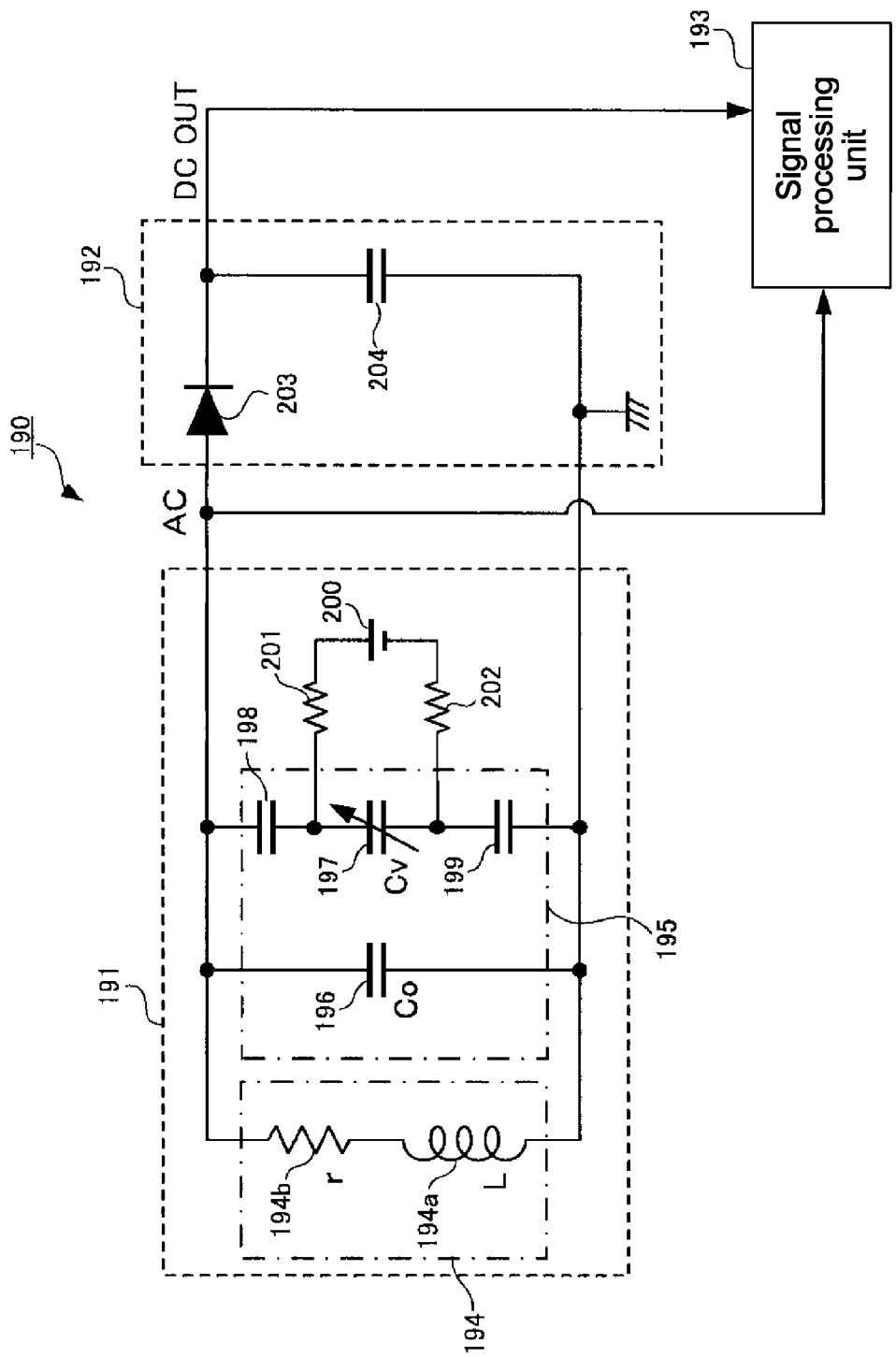
FIG. 28 is a block structural diagram showing a non-contact reception apparatus according to a fourth embodiment.

In this embodiment, as an example of a non-contact reception apparatus, a non-contact IC (integrated circuit) card is given. FIG. 28 is a diagram showing a block structure of a reception-system (demodulation-system) circuit unit of a non-contact IC card of this embodiment. In FIG. 28, a transmission-system (modulation-system) circuit unit of a signal is not shown for ease of explanation. The structure of the transmission-system circuit unit can be set to be the same as that of a non-contact IC card or the like in related art.

A non-contact IC card 190 includes a reception unit 191 (antenna), a rectification unit 192, and a signal processing unit 193.

The reception unit 191 includes a resonance circuit that is provided with a resonance coil 194 and a resonance capacitor 195, and receives a signal transmitted from a reader-writer (not shown) of the non-contact IC card 190 with the resonance circuit. It should be noted that in FIG. 28, the resonance coil 194 is divided into an inductance component 194a (L)

and a resistance component 194b (r: about several ohms). Further, the reception unit 191 includes a control power source 200 of a variable-capacitance capacitor 197 (described later) in the resonance capacitor 195 and two current-limiting resistors 201 and 202 provided between the variable-capacitance capacitor 197 and the control power source 200.

The resonance capacitor 195 is constituted of a constant-capacitance capacitor 196 having a capacitance Co, the variable-capacitance capacitor 197, and two bias elimination capacitors 198 and 199 that are connected to the both terminals of the variable-capacitance capacitor 197, respectively. Further, the constant-capacitance capacitor 196 and a series circuit including the variable-capacitance capacitor 197 and the two bias elimination capacitors 198 and 199 are connected in parallel to the resonance coil 194.

The constant-capacitance capacitor 196 is formed of any one of the multilayer capacitors described in the above embodiments and the above modified examples. Dielectric layers constituting the constant-capacitance capacitor 196 are formed of the dielectric material (paraelectric material) having the low permittivity described in the first embodiment, and the capacitance thereof is hardly changed regardless of a kind (alternate current or direct current) of an input signal or a signal level thereof.

It should be noted that on an actual circuit, there arises a capacitance variation (about several pF) of the reception portion 191 due to a variation of the inductance component L of the resonance coil 194, a parasitic capacitance of an input terminal of an integrated circuit in the signal processing unit 193, or the like, and an amount of the capacitance variation differs from the non-contact IC card 190 to another. Therefore, in this embodiment, to suppress (correct) such an influence, an electrode pattern of the internal electrodes in the constant-capacitance capacitor 196 is subjected to trimming, thereby adjusting the capacitance Co as appropriate.

The variable-capacitance capacitor 197 is also formed of any one of the multilayer capacitors described in the above embodiments and the above modified examples. The dielectric layers constituting the variable-capacitance capacitor 197 are formed of a ferroelectric material having a large relative permittivity described in the first embodiment.

Further, the variable-capacitance capacitor 197 is connected to the control power source 200 through the current-limiting resistors 201 and 202. A capacitance Cv of the variable-capacitance capacitor 197 varies depending on a control voltage applied from the control power source 200.

It should be noted that the bias elimination capacitors 198 and 199 and the current-limiting resistors 201 and 202 are provided for suppressing an influence due to interference between a DC bias current (control current) supplied from the control power source and a reception signal current. Specifically, the bias elimination capacitors 198 and 199 are provided for at least one of protection and separation of a signal circuit, and the current-limiting resistors 201 and 202 are provided for at least one of protection and separation of a control circuit.

The rectification unit 192 is constituted of a half-wave rectifier circuit including a rectification diode 203 and a rectification capacitor 204, and rectifies an AC voltage received by the reception unit 191 into a DC voltage to be output.

The signal processing unit 193 is mainly formed of an LSI (large scale integration) circuit of a semiconductor device, and demodulates the AC signal received by the reception unit 191. The LSI in the signal processing unit 193 is driven with the DC voltage supplied from the rectification unit 192. It should be noted that an LSI that is used in a non-contact IC card in related art can be used.

In the non-contact IC card 190 of this embodiment, the variable-capacitance capacitor 197 is used for preventing the control circuit formed of a semiconductor device whose voltage resistance is low from being broken down by excessive reception signals. Specifically, in the case where the reception signals are excessive, the capacitance Cv of the variable-capacitance capacitor 197 is made to be small by the control voltage. As a result, the resonance frequency of the reception unit 191 is shifted to a higher range by a frequency $\Delta f$ corresponding to the reduction of the capacitance of the variable-capacitance capacitor 197. Thus, a response of the reception signal at a resonance frequency $f_0$ before the capacitance is changed is reduced as compared to the state before the capacitance is changed, thereby suppressing the level of the reception signal. As a result, it is possible to prevent the excessive current signals from being supplied to the control circuit, which can prevent the breakdown of the control circuit.

In the non-contact IC card of this embodiment, the multilayer capacitor according to one of the embodiments and the modified examples is used for the constant-capacitance capacitor 196 and the variable-capacitance capacitor 197, with the result that a higher-performance non-contact IC card can be provided. In addition, the multilayer capacitor according to one of the embodiments and the modified examples is used for the variable-capacitance capacitor 197, with the result that the non-contact IC card can be driven with a further reduced drive voltage.

It should be noted that in this embodiment, the example is given in which both of the constant-capacitance capacitor 196 and the variable-capacitance capacitor 197 are formed of the multilayer capacitor according to one of the embodiments and the modified examples. However, the present invention is not limited to this. One of the constant-capacitance capacitor 196 and the variable-capacitance capacitor 197 may be formed of the multilayer capacitor according to one of the embodiments and the modified examples. Further, in this embodiment, the structure without the constant-capacitance capacitor 196 may be used.

Further, the example is given in which the control power source 200 of the variable-capacitance capacitor 197 is provided in the non-contact IC card 190 of this embodiment. However, the present invention is not limited to this. For example, a structure may be used in which a desired control voltage is extracted from a DC voltage that is output from the rectification unit 192 by a method of dividing the resistance or the like.

In addition, in this embodiment, as an example of the non-contact reception apparatus, the non-contact IC card is given as an example. However, the present embodiments can be applied to an arbitrary apparatus that receives at least one of information and electric power in a non-contact manner using a resonance circuit formed of a resonance coil and a resonance capacitor, and the same effect as above can be obtained. For example, the present embodiments can be applied to a cellular phone, a wireless power transmission apparatus, or the like. A wireless power transmission apparatus does not have to include a signal processing unit that demodulates a reception signal unlike a non-contact IC card, because the wireless power transmission apparatus is an apparatus that transmits power in a non-contact manner.

It should be understood that various changes and modifications to the presently preferred embodiments described herein will be apparent to those skilled in the art. Such changes and modifications can be made without departing from the spirit and scope of the present subject matter and The invention is claimed as follows:

1. A capacitance element comprising:
   a first electrode to which a signal having a first polarity is applied;
   a second electrode to which a signal having a second polarity is applied, the second polarity being opposite to the first polarity;
   a third electrode to which the signal having the second polarity is applied, the third electrode being disposed on a position opposed to the second electrode;
   a fourth electrode to which the signal having the first polarity is applied;
   a first dielectric portion provided between the first electrode and the second electrode;
   a second dielectric portion provided between the second electrode and the third electrode;
   a third dielectric portion provided between the third electrode and the fourth electrode;
   a first external terminal connected to the first electrode and the fourth electrode; and
   a second external terminal connected to the second electrode and the third electrode;
   wherein the first dielectric portion is formed of a first dielectric layer, the first electrode is formed on a first surface of the first dielectric layer, and the second electrode is formed on a second surface of the first dielectric layer, the second surface being opposite to the first surface,
   wherein, when the first electrode is projected on the second surface on which the second electrode is formed, a projection pattern of the first electrode is overlapped with the second electrode,
   wherein the third dielectric portion is formed of a third dielectric layer, the third electrode is formed on a first surface of the third dielectric layer, and the fourth electrode is formed on a second surface of the third dielectric layer, the second surface being opposite to the first surface, and
   wherein, when the third electrode is projected on the second surface on which the fourth electrode is formed, a projection pattern of the third electrode is overlapped with the fourth electrode.

2. The capacitance element according to claim 1,
   wherein the first electrode includes a first electrode portion that is extended in a first direction on the first surface of the first dielectric layer,
   wherein the second electrode includes a second electrode portion that is extended in a second direction on the second surface of the first dielectric layer, the second direction and the first direction being intercrossed,
   wherein the third electrode includes a third electrode portion that is extended in the second direction on the first surface of the third dielectric layer, and
   wherein the fourth electrode includes a fourth electrode portion that is extended in the first direction on the second surface of the third dielectric layer.

3. The capacitance element according to claim 1,
   wherein the first dielectric portion and the third dielectric portion are each made of a ferroelectric material.

4. A capacitance element comprising:
   a first electrode to which a signal having a first polarity is applied;
   a second electrode to which a signal having a second polarity is applied, the second polarity being opposite to the first polarity;
   a third electrode to which the signal having the second polarity is applied, the third electrode being disposed on a position opposed to the second electrode;
   a fourth electrode to which the signal having the first polarity is applied;
   a first dielectric portion provided between the first electrode and the second electrode;
   a second dielectric portion provided between the second electrode and the third electrode;
   a third dielectric portion provided between the third electrode and the fourth electrode;
   a first external terminal connected to the first electrode and the fourth electrode; and
   a second external terminal connected to the second electrode and the third electrode;
   wherein the first electrode and the second electrode are formed on a first side surface of the second dielectric portion while being separated at a predetermined interval, and the first dielectric portion is a part of the second dielectric portion disposed between the first electrode and the second electrode, and
   wherein the third electrode and the fourth electrode are formed on a second side surface of the second dielectric portion while being separated at a predetermined interval, and the third dielectric portion is a part of the second dielectric portion disposed between the third electrode and the fourth electrode.

5. The capacitance element according to claim 4,
   wherein the first dielectric portion and the third dielectric portion are each made of a ferroelectric material.

6. A resonance circuit comprising:
   a resonance capacitor including a capacitance element, the capacitance element including
      a first electrode to which a signal having a first polarity is applied,
      a second electrode to which a signal having a second polarity opposite to the first polarity is applied,
      a third electrode which is disposed on a position opposed to the second electrode and to which the signal having the second polarity is applied,
      a fourth electrode to which the signal having the first polarity is applied,
      a first dielectric portion provided between the first electrode and the second electrode,
      a second dielectric portion provided between the second electrode and the third electrode,
      a third dielectric portion provided between the third electrode and the fourth electrode,
      a first external terminal connected to the first electrode and the fourth electrode, and
      a second external terminal connected to the second electrode and the third electrode; and
   a resonance coil connected to the resonance capacitor;
   wherein the first dielectric portion is formed of a first dielectric layer, the first electrode is formed on a first surface of the first dielectric layer, and the second electrode is formed on a second surface of the first dielectric layer, the second surface being opposite to the first surface,
   wherein, when the first electrode is projected on the second surface on which the second electrode is formed, a projection pattern of the first electrode is overlapped with the second electrode, wherein the third dielectric portion is formed of a third dielectric layer, the third electrode is formed on a first surface of the third dielectric layer, and the fourth electrode is formed on a second surface of the third dielectric layer, the second surface being opposite to the first surface, and wherein, when the third electrode is projected on the second surface on which the fourth electrode is formed, a projection pattern of the third electrode is overlapped with the fourth electrode.

7. A capacitance element comprising:

a first electrode to which a signal having a first polarity is applied;

a second electrode to which a signal having a second polarity is applied, the second polarity being opposite to the first polarity;

a third electrode to which the signal having the second polarity is applied, the third electrode being disposed on a position opposed to the second electrode;

a fourth electrode to which the signal having the first polarity is applied;

a first dielectric portion provided between the first electrode and the second electrode;

a second dielectric portion provided between the second electrode and the third electrode;

a third dielectric portion provided between the third electrode and the fourth electrode;

a first external terminal connected to the first electrode and the fourth electrode; and a second external terminal connected to the second electrode and the third electrode, wherein the first dielectric portion is formed of a first dielectric layer, the first electrode is formed on a first surface of the first dielectric layer, and the second electrode is formed on a second surface of the first dielectric layer, the second surface being opposite to the first surface, wherein, when the first electrode is projected on the second surface on which the second electrode is formed, a projection pattern of the first electrode is not overlapped with the second electrode, wherein the third dielectric portion is formed of a third dielectric layer, the third electrode is formed on a first surface of the third dielectric layer, and the fourth electrode is formed on a second surface of the third dielectric layer, the second surface being opposite to the first surface, and wherein, when the third electrode is projected on the second surface on which the fourth electrode is formed, a projection pattern of the third electrode is not overlapped with the fourth electrode.

8. A capacitance element comprising:

a first electrode to which a signal having a first polarity is applied;

a second electrode to which a signal having a second polarity is applied, the second polarity being opposite to the first polarity;

a third electrode to which the signal having the second polarity is applied, the third electrode being disposed on a position opposed to the second electrode;

a fourth electrode to which the signal having the first polarity is applied;

a first dielectric portion provided between the first electrode and the second electrode;

a second dielectric portion provided between the second electrode and the third electrode;

a third dielectric portion provided between the third electrode and the fourth electrode;

a first external terminal connected to the first electrode and the fourth electrode; and a second external terminal connected to the second electrode and the third electrode, wherein the second dielectric portion includes at least two dielectric layers and a fifth electrode to which the signal having the second polarity is applied, the fifth electrode being formed between the two dielectric layers.

* * * * *